United States Patent
Shimomura

(10) Patent No.: US 6,873,912 B2
(45) Date of Patent: Mar. 29, 2005

(54) VEHICLE TRACKING SYSTEM

(75) Inventor: Noriko Shimomura, Yokohama (JP)

(73) Assignee: Nissan Motor Co. Ltd., Kanagawa (JP)

( * ) Notice: Subject to any disclaimer, the term of this patent is extended or adjusted under 35 U.S.C. 154(b) by 75 days.

(21) Appl. No.: 10/630,780

(22) Filed: Jul. 31, 2003

(65) Prior Publication Data

US 2004/0054473 A1 Mar. 18, 2004

(30) Foreign Application Priority Data

Sep. 17, 2002 (JP) .............................. 2002-269638

(51) Int. Cl.$^7$ ............................. G06T 7/00; G08G 1/16; G01B 11/00
(52) U.S. Cl. ............................. 701/301; 701/28; 701/96; 701/116; 701/223; 340/937; 340/435; 342/70; 348/119; 180/167
(58) Field of Search ............................. 701/28, 96, 116, 701/223, 301; 340/937, 435; 342/70, 71, 458; 348/118, 119; 180/167

(56) References Cited

U.S. PATENT DOCUMENTS

| | | | | | |
|---|---|---|---|---|---|
| 5,161,632 A | * | 11/1992 | Asayama | .................... | 180/167 |
| 5,195,144 A | * | 3/1993 | Le Parquier et al. | ....... | 382/104 |
| 5,257,022 A | * | 10/1993 | Irie | ............................ | 340/988 |
| 5,369,590 A | * | 11/1994 | Karasudani | ................. | 701/300 |
| 5,530,771 A | * | 6/1996 | Maekawa | .................... | 382/103 |
| 6,191,704 B1 | * | 2/2001 | Takenaga et al. | ........... | 340/903 |
| 6,590,521 B1 | * | 7/2003 | Saka et al. | ..................... | 342/70 |

FOREIGN PATENT DOCUMENTS

| | | |
|---|---|---|
| JP | 11-345336 A | 12/1999 |
| JP | 2000-113158 A | 4/2000 |
| JP | 2002-207390 A | 7/2002 |

* cited by examiner

Primary Examiner—Michael J. Zanelli
Assistant Examiner—Eric M. Gibson
(74) Attorney, Agent, or Firm—Shinjyu Global IP Counselors, LLP

(57) ABSTRACT

A vehicle tracking system for a vehicle is configured to track a remote vehicle by template matching between a reference image and an input image obtained by a camera mounted on the vehicle. The position and distance of a remote vehicle is determined by calculating a position and an enlargement/reduction ratio of a portion of the input image that provide a maximum correlation value between the portion of the input image and the reference template that is greater than a threshold value. The reference template is updated by calculating a dispersion of at least one pixel of the reference template with respect to a corresponding pixel in a vehicle image extracted from the input image that provides the maximum correlation value, and by deleting the at least one pixel when the dispersion of the at least one pixel is equal to or greater than a threshold value.

19 Claims, 14 Drawing Sheets

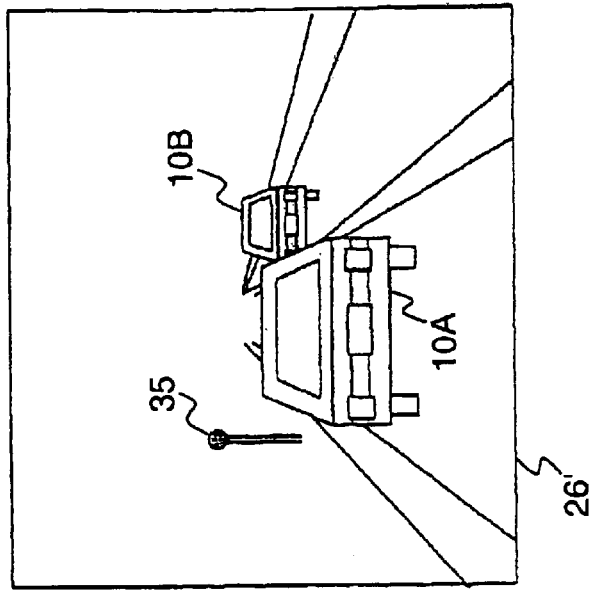
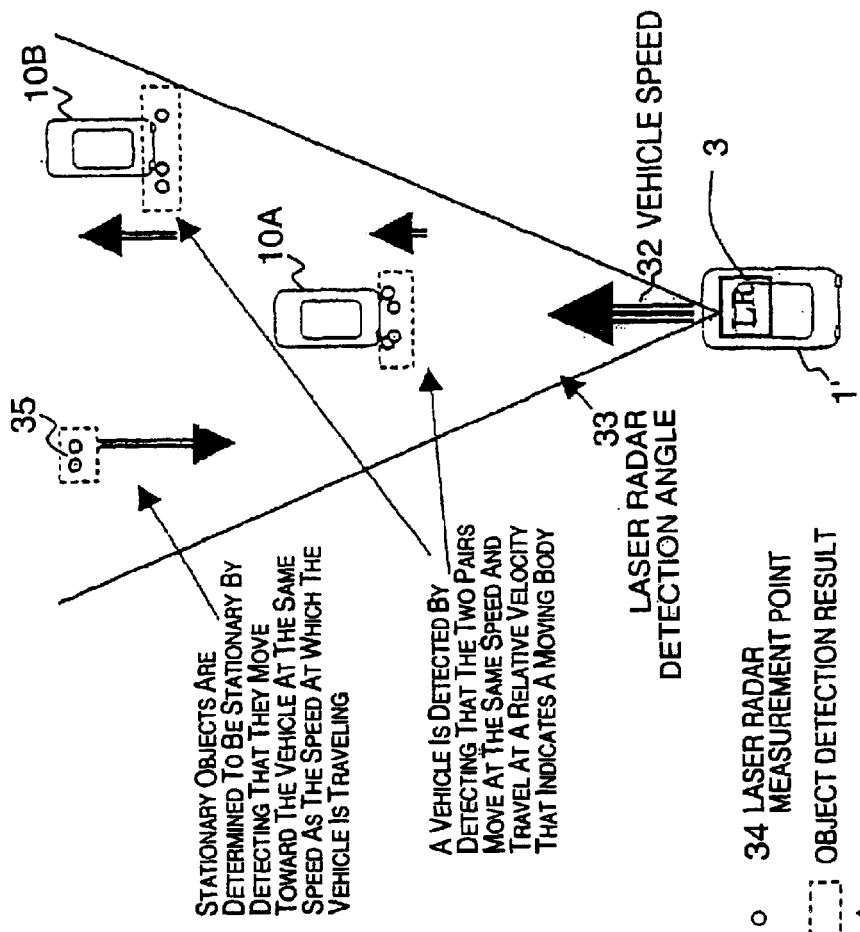
Fig. 11(b)
Fig. 11(a)

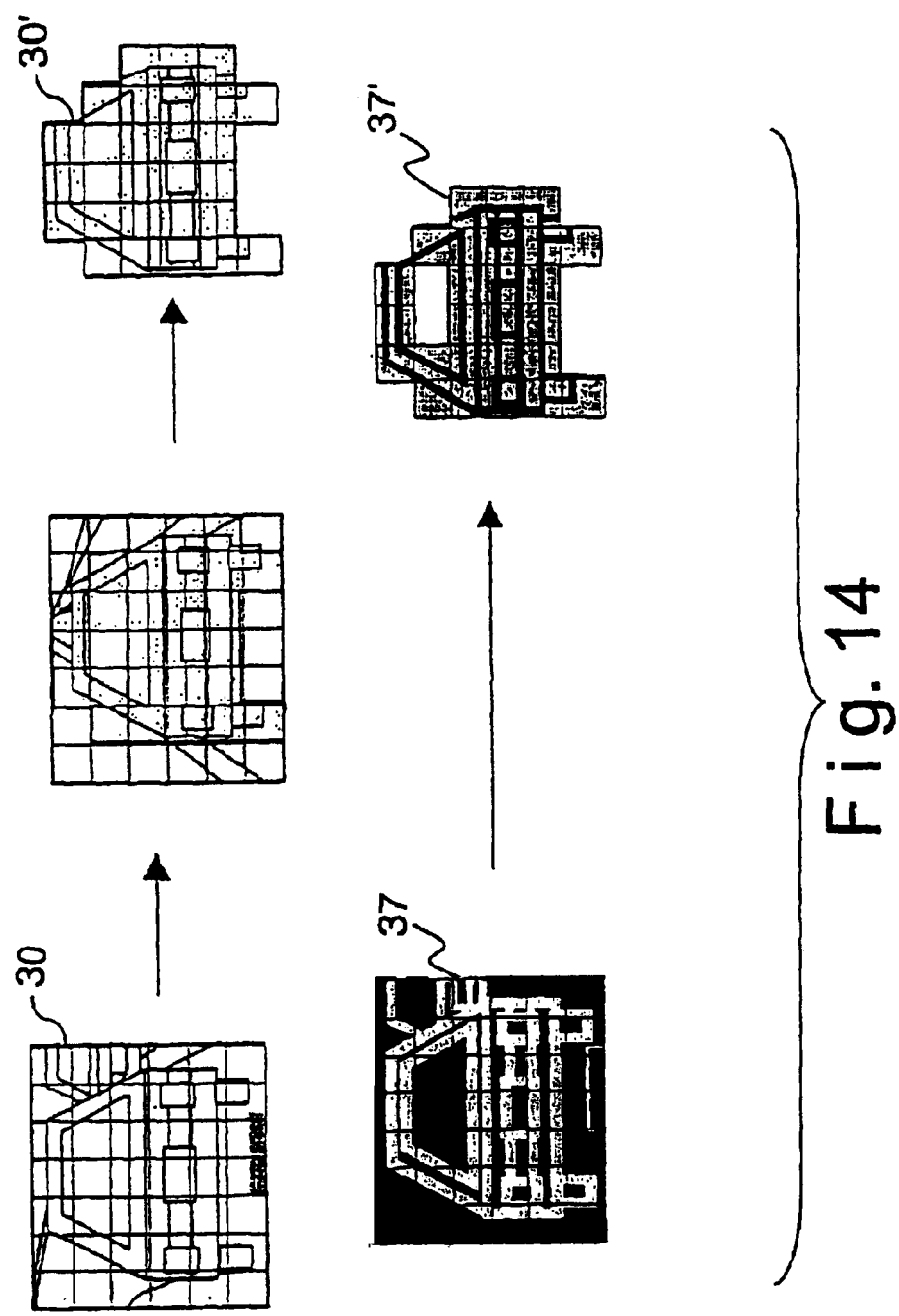

VEHICLE TRACKING SYSTEM

BACKGROUND OF THE INVENTION

1. Field of the Invention

The present invention relates to a vehicle tracking system installed on a vehicle. Specifically, the present invention relates to a vehicle tracking system that tracks a vehicle in a reliable manner by using template matching. Preferably, the vehicle tracking system is a preceding vehicle tracking system that tracks a preceding vehicle.

2. Background Information

One example of a conventional vehicle tracking system using template matching is disclosed in the Japanese Laid-Open Patent Publication No. 2000-113158. This publication describes a system for tracking an object in which a reference template is defined for a vehicle detected by using image processing of an input image. Moreover, the system disclosed in the above publication detects a new position of the vehicle by finding a correlation between a newly inputted image and the reference template. If the correlation value is high, the reference template is updated to an image of a portion from new image including the position where the vehicle was detected. Since the template matching position corresponds to the position of the vehicle, tracking and vehicle position measuring can be accomplished simultaneously. Moreover, the template matching can accommodate changes in the size of the preceding vehicle.

In view of the above, it will be apparent to those skilled in the art from this disclosure that there exists a need for an improved preceding vehicle tracking system. This invention addresses this need in the art as well as other needs, which will become apparent to those skilled in the art from this disclosure.

SUMMARY OF THE INVENTION

It has been discovered that, in the conventional tracking system described above, when a reference template of a preceding vehicle is created which includes items of high contrast in the background, e.g., a white line on the road, it is easy for the system to mistakenly track the white line instead of the preceding vehicle because the intensity of the white line is often stronger than the intensity of the edges of the preceding vehicle. In short, it is difficult to reliably track the preceding vehicle.

Accordingly, one object of the present invention is to provide a preceding vehicle tracking system that can track a preceding vehicle in a reliable manner.

In order to achieve the foregoing object, a vehicle tracking system for a vehicle is provided with a first camera, an image memory, a vehicle detecting section, a reference template creating section, a reference template storing memory, a vehicle tracking processing section, a processing result outputting section, a vehicle image storage memory and a reference template updating section. The first camera is mounted on the vehicle. The image memory is configured and arranged to store a first and second input images containing a remote vehicle received from the first camera. The vehicle detecting section is configured and arranged to detect the remote vehicle based on the first input image stored in the image memory. The reference template creating section is configured and arranged to extract an image region including the remote vehicle from the first input image to be used as a reference template. The reference template storing memory is configured and arranged to store the reference template and a position in the first input image where the reference template was extracted. The vehicle tracking processing section is configured and arranged to determine a position and an enlargement/reduction ratio for at least a portion of the second input image that provide a maximum correlation value between the portion of the second input image and the reference template with respect to the remote vehicle, while enlarging or reducing the portion of the second input image in consideration of a change in size of the remote vehicle in the second input image. The processing result outputting section is configured and arranged to determine a position of the remote vehicle relative to the vehicle based on the position and the enlargement/reduction ratio of the portion of the second input image that provide the maximum correlation value. The vehicle image storage memory is configured and arranged to consecutively store a vehicle image used to calculate correlation values with respect to the reference template extracted from the portion of the second input image at the position and the enlargement/reduction ratio that provide the maximum correlation value. The reference template updating section is configured and arranged to normalize the vehicle image and the reference template, calculate a dispersion of at least one pixel of the reference template with respect to a pixel at a corresponding position in the vehicle image, and update the reference template by deleting the at least one pixel when the dispersion of the at least one pixel is equal to or greater than a threshold value.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 11(a) is a diagrammatic view illustrating a measurement position of the laser radar of the preceding vehicle tracking system in accordance with the third embodiment of the present invention;

FIG. 11(b) is a diagrammatic view of the forward image captured by the camera of the preceding vehicle tracking system in accordance with the third embodiment of the present invention at the same point in time shown in FIG. 11(b);

FIG. 14 is a diagrammatic view of a differential image and a reference template obtained using the differential image utilized in the preceding vehicle tracking system in accordance with the fourth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
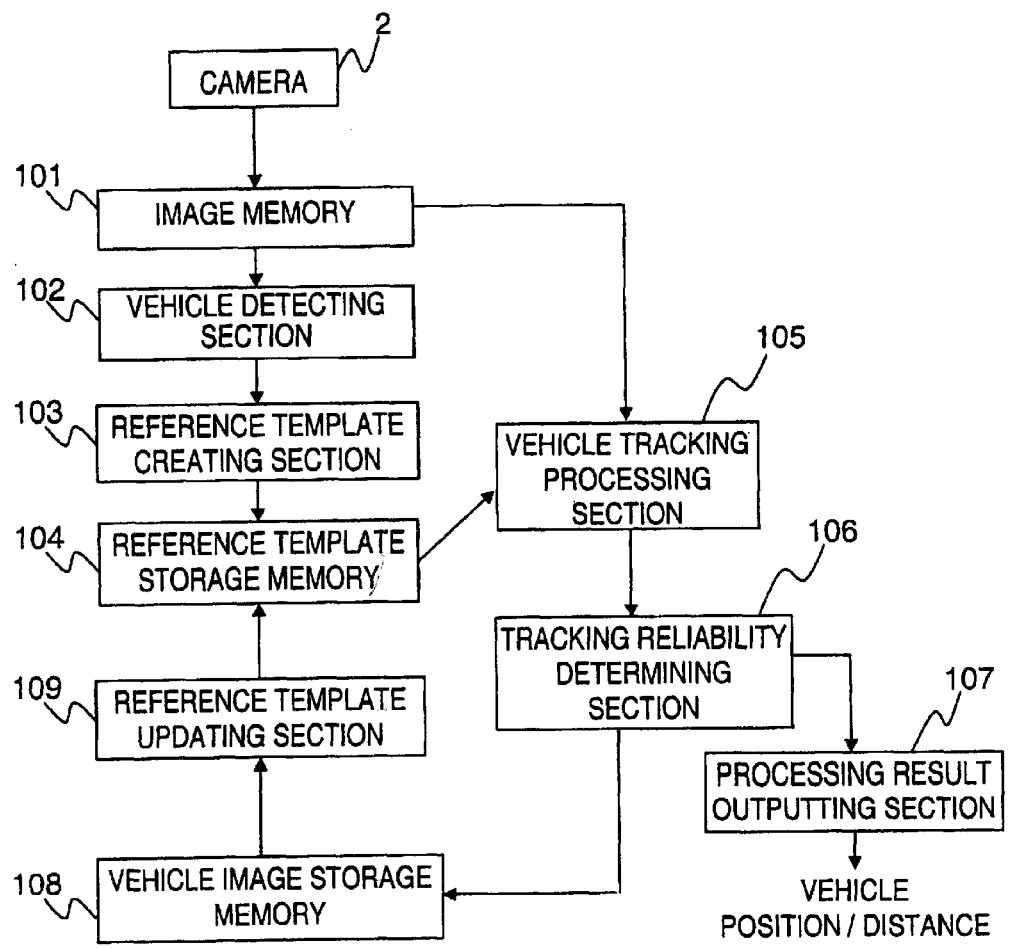
FIG. 1 is a block diagram illustrating a preceding vehicle tracking system in accordance with a first embodiment of the present invention.
Figure 2A:
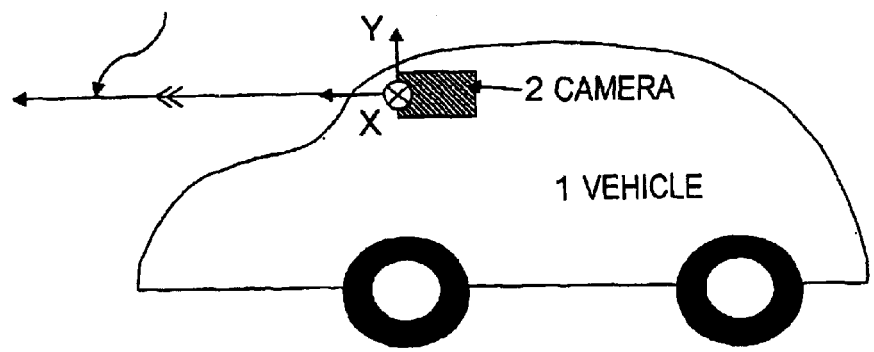
FIG. 2(a) is a schematic side view of a vehicle with a camera and a reference coordinate system of the preceding vehicle tracking system in accordance with the first embodiment of the present invention.
Figure 2B:
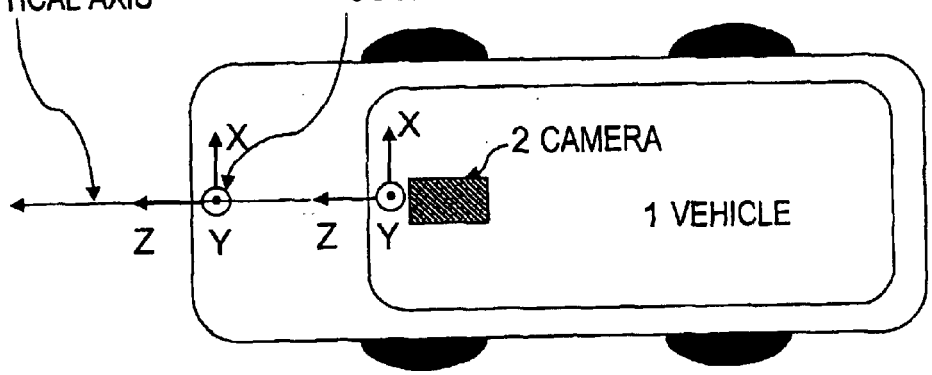
FIG. 2(b) is a schematic top plan view of the vehicle illustrated in FIG. 2(a) with the preceding vehicle tracking system in accordance with the first embodiment of the present invention.

Referring initially to FIGS. 1–7, a preceding vehicle tracking system for a vehicle 1 (FIGS. 2(a) and 2(b)) is illustrated in accordance with a first embodiment of the present invention. FIG. 1 is a block diagram of the preceding vehicle tracking system in accordance with the first embodiment of the present invention. While the tracking system in accordance with the present invention is described for tracking a vehicle in front of the vehicle 1, it will be apparent to those skilled in the art that any remote vehicle can be tracked using the present invention. The preceding vehicle tracking system basically comprises a first electronic camera 2 mounted on the vehicle 1 (FIGS. 2(a) and 2(b)), an image memory or storage section 101, a vehicle detecting section 102, a reference template creating section 103, a reference template storage memory or section 104, a vehicle tracking processing section 105, a tracking reliability determining section 106, a processing result outputting section 107, a vehicle image storage memory or section 108, and a reference template updating section 109. These sections 101–109 are part of a vehicle controller that preferably includes a microcomputer with various control programs that perform the operations to track one or more vehicles as discussed below. This vehicle controller can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the vehicle controller can be any combination of hardware and software that will carry out the operations of tracking one or more vehicles in accordance with of the present invention as discussed below. Moreover, "means plus function" clauses as utilized in the specification and claims for these sections 101–109 should include any structure or hardware and/or algorithm or software that can be utilized to carry out the function of the "means plus function" clause.

The electronic camera 2 (hereinafter "camera 2") is configured and arranged to photograph a detection area that encompasses a forward direction of the vehicle 1. The image memory 101 is configured and arranged to store a plurality of input images of the area photographed or obtained by the camera 2.

The vehicle detecting section 102 is configured and arranged to detect at least one preceding or remote vehicle 10 in input images based on a prescribed processing as explained in detail below. The reference template creating section 103 is configured and arranged to extract a portion from a first input image 26, which includes an image of the preceding vehicle 10 being tracked or detected in the vehicle detecting section 102. This extracted image from the input image 26 is used as a reference template 30. The reference template storage memory 104 is configured and arranged to store the reference template 30. Then, one or more subsequent or second input images 27 are obtained by the camera. These subsequent or second input images 27 are compare with the input image 26 using template matching to track the preceding vehicle 10 (i.e., determine relative changes in position and distance of the preceding vehicle 10).

The vehicle tracking processing section 105 is configured and arranged to track the preceding vehicle 10 based on the input images 26 and 27 containing the preceding vehicle 10 that are consecutively obtained by the camera 2. More specifically, the vehicle tracking processing section 105 is configured and arranged to track the preceding vehicle 10 in the input images 27 by using template matching. In particular, prescribed portions of the input images 27 are matched with the reference template 30 from the input image 26, by enlarging or reducing the prescribed portions of the input images 27. By determining in the change in size and location of the preceding vehicle 10 in the one of the input images 27 relative to the reference template 30, the change in distance and position of the preceding vehicle 10 from vehicle 1 can be determined. In other words, the vehicle tracking processing section 105 is configured to execute correlation calculations incorporating expansion and reduction of the input images 27 or the reference template 30.

The tracking reliability determining section 106 is configured and arranged to determine the reliability of the tracking results based on the correlation value of the template matching by the vehicle tracking processing section 105.

The processing result outputting section 107 is configured and arranged to output a distance and position of the preceding vehicle 10 with respect to the vehicle 1 at that point in time when the input image 27 is captured based on the vehicle tracking results from the vehicle tracking processing section 105 when the tracking reliability determining section 106 determines the reliability of the tracking result is high.

Moreover, the vehicle image storage memory 108 is configured and arranged to consecutively store a plurality of vehicle images 30A–30E extracted from the input images 27 when the tracking reliability determining section 106 determines the reliability of the tracking result is high. The vehicle images 30A–30E are used for subsequent reference template updating calculations. Each of the vehicle images 30A–30E contains an extracted image of the preceding vehicle 10 that has been enlarged or reduced at an enlargement/reduction ratio that provides the maximum correlation with respect to the reference template 30. Accordingly, the size of the preceding vehicle 10 in the vehicle images 30A–30E has been matched to the size of the preceding vehicle 10 in the reference template 30.

The reference template updating section 109 is configured and arranged to normalize the reference template 30 and the vehicle images 30A–30E stored consecutively in the vehicle image storage memory 108. The reference template updating section 109 is further configured and arranged to calculate a dispersion of each pixel of the reference template 30 and a corresponding pixel in the vehicle images 30A–30E to update the reference template 30 based on the dispersion of each pixel. Thus, an updated reference template 30 can be created that is a more accurate for use in subsequent tracking.

FIGS. 2(*a*) and 2(*b*) illustrate the vehicle 1 in which the preceding vehicle tracking system is installed and an optical axis 21 of the camera 2. FIG. 2(*b*) shows a three-dimensional reference coordinate system 22 used to express the position of an object (preceding vehicle 10) being detected relative to the vehicle 1.

As shown in FIGS. 2(*a*) and 2(*b*), the camera 2 is mounted on a front part of the vehicle 1. The camera 2 is configured and arranged to photograph a detection area in front of the vehicle 1. A photographed image, i.e., the input image 27, is then stored in the image memory 101 shown in FIG. 1. Based on the input images 27 stored in the image memory 101, the vehicle detecting section 102 is configured and arranged to detect a position where the preceding vehicle 10 exists in the input image 27 by executing an image processing on the input image 27. The image processing executed in the vehicle detecting section 102 can be accomplished using a conventional method.

Figure 3A:
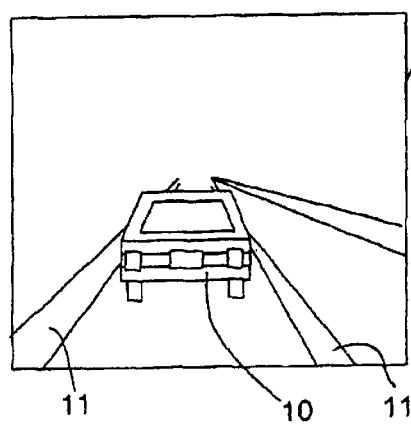
FIG. 3(a) is a diagrammatic view of an input image obtained by a camera of the preceding vehicle tracking system in accordance with the first embodiment of the present invention.
Figure 3B:
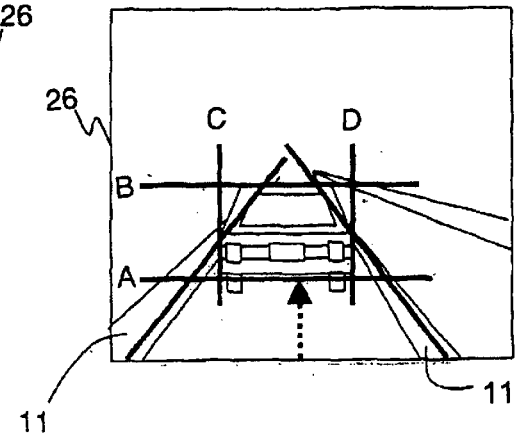
FIG. 3(b) is a diagrammatic view illustrating a detection of a preceding vehicle executed in the preceding vehicle tracking system in accordance with the first embodiment of the present invention.
Figure 3C:
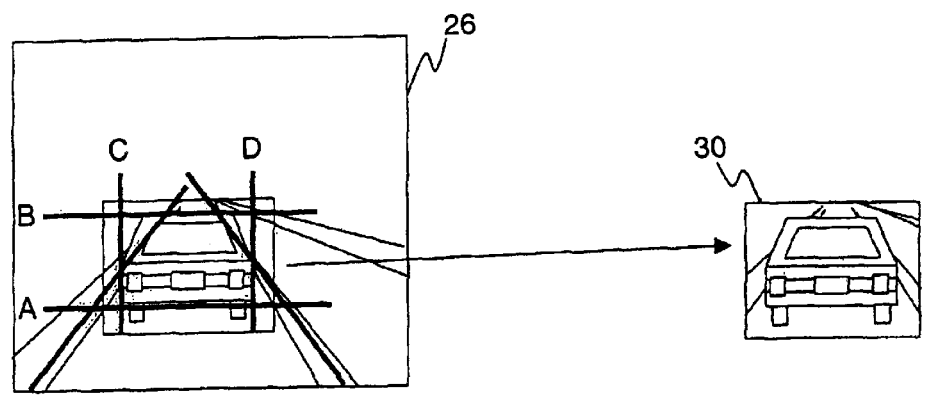
FIG. 3(c) is a diagrammatic view illustrating a extraction of a reference template executed in the preceding vehicle tracking system in accordance with the first embodiment of the present invention.

FIGS. 3(*a*) and 3(*b*) illustrate one example of detecting the preceding vehicle 10 with the image processing executed in the vehicle detecting section 102. More specifically, FIG. 3(*a*) illustrates a diagrammatic view of a first input image 26 obtained by the camera 2 that contains the preceding vehicle 10. FIG. 3(*b*) diagrammatically illustrates an example of image processing that is executed in the vehicle detecting section 102 for detecting the preceding vehicle 10. FIG. 3(*c*) diagrammatically illustrates an example of image processing that is executed in the reference template creating section 103 for extracting the reference template 30 from the input image 26.

As seen in FIG. 3(*b*), the following image processing of the input image 26 is preferably executed in the vehicle detecting section 102. First, a horizontal edge (transverse) A disposed between the white lines 11 drawn on the road is detected by moving upward from the bottom of the input image 26 as illustrated by a broken line arrow in FIG. 3(*b*). Second, a horizontal edge B located further upward than the horizontal edge A is detected. Third, two vertical edges C and D are detected which extend in the region between horizontal edges A and B. In other words, a histogram (bar chart) of the edges between the white lines 11 is used to detect a pair of upper and lower horizontal edges A and B and a pair of left and right vertical edges C and D.

When the preceding vehicle 10 is detected, the reference template creating section 103 shown in FIG. 1 is configured and arranged to extract a portion of the input image 26 that includes the preceding vehicle 10 detected by the vehicle detecting section 102, as shown in FIG. 3(*c*). The extracted image portion of the input image 26 is defined, for example, to include the lower, upper, left and right edges A, B, C, and D of the preceding vehicle 10 detected during the image processing executed by the vehicle detecting section 102. Then, the reference template storage memory 104 is configured and arranged to store the extracted image portion as the reference template 30. The reference template storage memory 104 is also configured and arranged to store the relative position in the input image 26 where the reference template 30 was extracted as a reference position of the reference template 30.

During the detection of the preceding vehicle 10 executed by the vehicle detecting section 102, the position and the distance of the preceding vehicle 10 with respect to the vehicle 1 are calculated based on the position and the size of the preceding vehicle 10 in the input image 26.

Figure 4A:
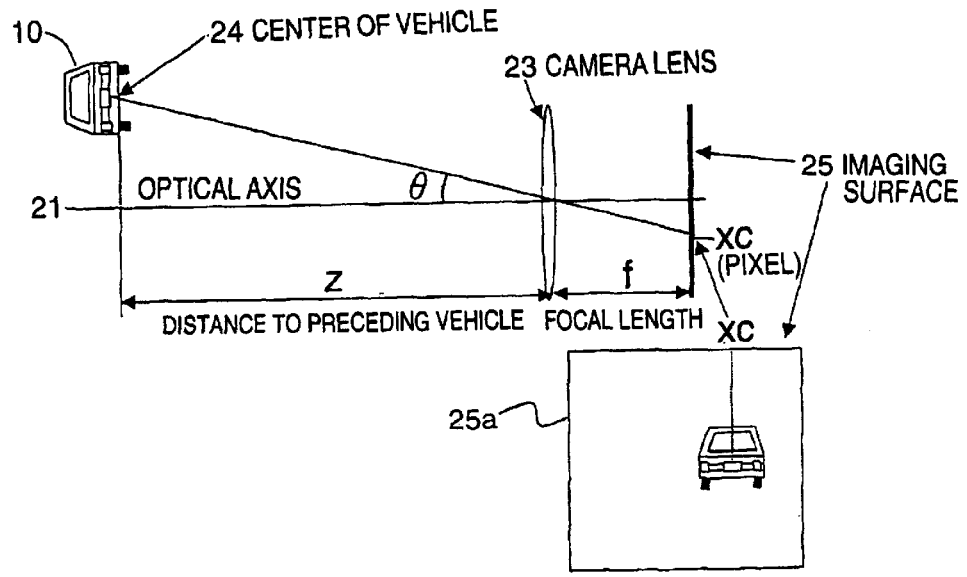
FIG. 4(a) is a diagrammatic view showing a relationship between an actual position of the preceding vehicle and a position of the preceding vehicle in an input image obtained by the camera of the preceding vehicle tracking system in accordance with the first embodiment of the present invention.
Figure 4B:
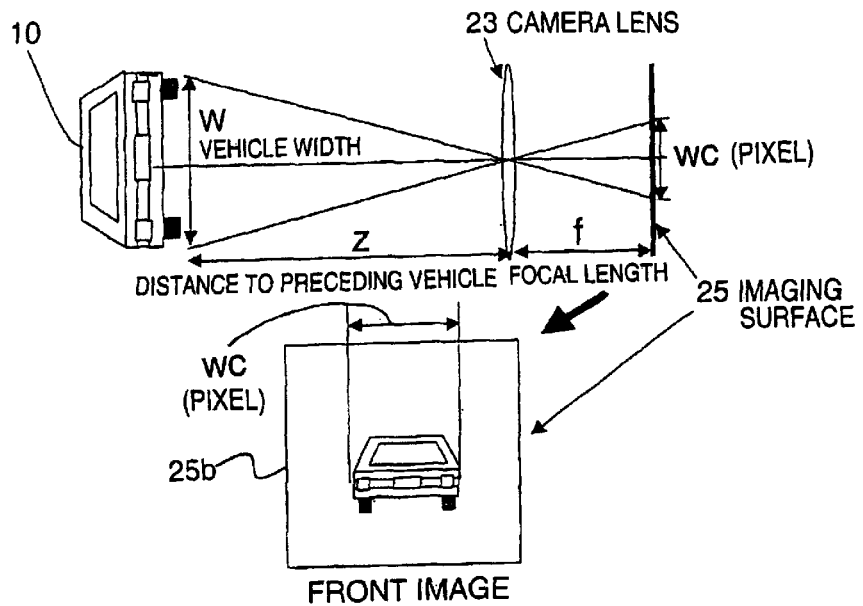
FIG. 4(b) is a diagrammatic view showing a relationship between an actual size (width) of the preceding vehicle and a size of the preceding vehicle in an input image obtained by the camera of the preceding vehicle tracking system in accordance with the first embodiment of the present invention.

FIG. 4(*a*) shows the relationship between the position of the preceding vehicle 10 in an image 25*a* and the actual three-dimensional position of the preceding vehicle 10 with respect to the vehicle 1. FIG. 4(*b*) shows the relationship between the size of the preceding vehicle 10 in an image 25*b* and the actual three-dimensional size of the preceding vehicle 10. As shown in FIGS. 4(*a*) and 4(*b*), the camera 2 installed on the vehicle 1 has a camera lens 23 with an optical axis 21 and a focal length f. The preceding vehicle 10 has an actual vehicle width w, and a center 24 with respect to the transverse direction. The camera 2 is configured to obtain an image (images 25*a* and 25*b*) containing the preceding vehicle 10 at an imaging surface 25. Thus, a vehicle image is transposed on the imaging surface 25. The vehicle image on the imaging surface 25 has an image vehicle center xc of the preceding vehicle 10 and an image vehicle width wc. The image vehicle center xc of the preceding vehicle 10 is defined in the image 25a as the point on the imaging surface 25 where a line that passes through the optical axis 21 and the center 24 of the preceding vehicle 10 strikes the imaging surface 25. In FIGS. 4(a) and 4(b), a distance z defines a distance to the preceding vehicle 10 with respect to the vehicle 1 (more specifically, the distance between the camera lens 23 and the preceding vehicle 10). The direction of the preceding vehicle 10 with respect to the camera lens 23 or the vehicle 1 is defined as a vehicle direction θ that represents a relative angle of the center 24 of the preceding vehicle 10 with respect to the optical axis 21 of the camera 2.

As explained above, the direction θ is the direction in which the detected preceding vehicle 10 exists relative to the vehicle 1. The direction θ is determined based on the direction in which the center xc of the preceding vehicle 10 exists in the image 25a. The direction θ is calculated by Equation 1 below.

$$\theta = \operatorname{atan}(f/xc) \qquad \text{Equation 1}$$

If the actual width w of the preceding vehicle 10 is already known, the distance z to the preceding vehicle 10 can be calculated based on the image width wc of the preceding vehicle 10 in the image 25b by using Equation 2 below.

$$z = f * w/wc \qquad \text{Equation 2}$$

Thus, the actual detected position of the preceding vehicle 10 with respect to the vehicle 1 can be calculated from the position of the preceding vehicle 10 in any input image obtained by the camera 2 by applying the preceding Equations 1 and 2.

After the preceding vehicle 10 has been detected in the vehicle detecting section 102, subsequent positions of the preceding vehicle 10 in subsequent input images 27 are detected by a tracking processing executed in the vehicle tracking processing section 105. The vehicle tracking processing section 105 is configured and arranged to execute template matching in which the input images 27 are matched with respect to the reference template 30 to determine the subsequent positions of the preceding vehicle 10.

The image size of the preceding vehicle 10 is proportional to the distance z between the vehicle 1 and the preceding vehicle 10, which changes over time. Therefore, the image size of the preceding vehicle 10 in the consecutively obtained input images also changes. Consequently, the vehicle tracking processing section 105 is configured and arranged to perform the template matching by enlarging or reducing one of the reference template 30 and the input images 27 such that the size of the preceding vehicle 10 in the reference template 30 and the size of the preceding vehicle 10 captured in the input images are the same.

Figure 5:
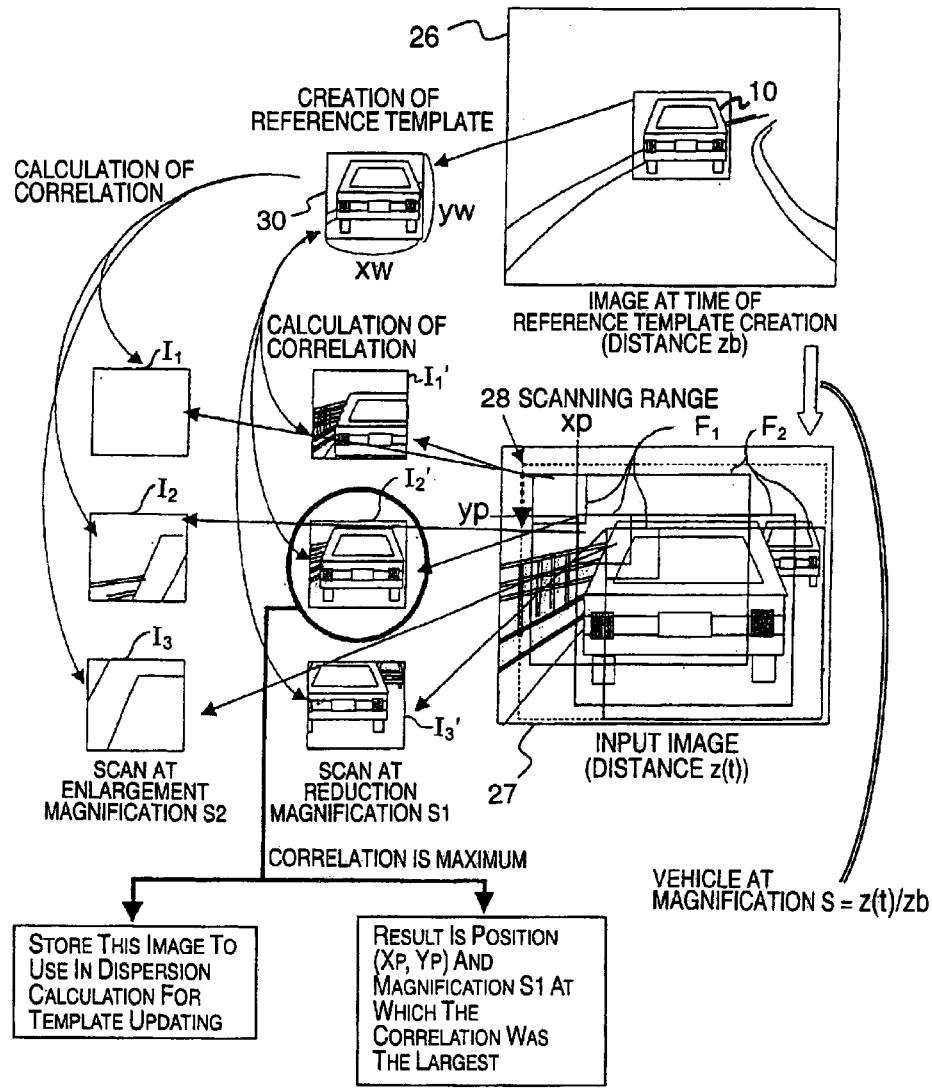
FIG. 5 is a diagrammatic view illustrating template matching using a reference template while enlarging or reducing the input image executed in the preceding vehicle tracking system in accordance with the first embodiment of the present invention.

FIG. 5 is a diagrammatic view illustrating the tracking processing executed in the vehicle tracking processing section 105 when template matching of the input image 27 to the reference template 30 is performed. More specifically, FIG. 5 includes views for explaining template matching conducted by enlarging or reducing extracted portions of the input image 27. Of course, it will be apparent to those skilled in the art that the reference template 30 can be enlarged or reduced in size to match the extracted portions of the input image 27.

The input image 26 in FIG. 5 represents an image obtained by the camera 2 at the point in time when the reference template 30 was created. A distance to the preceding vehicle 10 with respective to the vehicle 1, more specifically, a distance between the camera lens 23 and the preceding vehicle 10 at the point in time when the reference template 30 was created is defined as a distance zb. The input image 27, which is newly input from the camera 2, is compared to the reference template 30 within a scanning range 28 of the input image 27 to determine any change in vehicle position of the preceding vehicle 10 relative to the vehicle 1 at the point in time when the input image 27 is captured. A distance z(t) is defined as the distance to the preceding vehicle 10 with respective to the vehicle 1 at the point in time when the input image 27 is captured. More specifically, the distance z(t) is the distance between the camera lens 23 and the preceding vehicle 10 at the point in time when the input image 27 is captured.

Since the distance z(t) is unknown, the size of the preceding vehicle 10 in the input image 27 is unknown too. Therefore, template matching is performed by calculating the correlation between extracted portions of the input image 27 and the reference template 30. The extracted portions of the input image 27 are taken at a plurality of positions within the scanning range 28 of the input image 27 in the area surrounding the position where the preceding vehicle 10 was detected in a previous cycle of the tracking processing, and then enlarged or reduced at a plurality of enlargement/reduction ratios for matching with the reference template 30 to determine the correlation between the extracted portions of the input image 27 and the reference template 30. Of course, it will be apparent to those skilled in the art from this disclosure that the reference template 30 can be enlarged or reduced while the size of the input image 27 is maintained the same to determine the correlation between the reference template 30 and the extracted portions of the input image 27.

The correlation calculation is repeated at each position in the input image 27 by enlarging or reducing the extracted portion of the input image 27. By enlarging or reducing the extracted portion of the input image 27 and comparing the enlarged or reduced portion of the input image 27 to the reference template 30, it can be determined whether or not the size of the vehicle 10 in the input image 27 has changed, which means that the distance z(t) between the vehicle 1 and the preceding vehicle 10 from the distance zb has changed by an amount Δz. The amount Δz is proportional to the amount of change in size (increase, decrease, or the same) of the vehicle in the image. The vehicle tracking processing section 105 is preferably configured and arranged to perform the correlation calculation (template matching) by using a normalized correlation that uses brightness values of the input image 27 and the reference template 30.

The procedure for performing the correlation calculations will now be explained with reference to FIG. 5. For ease of understanding the present invention, the processing of the template matching of the present invention has been substantially simplified in FIG. 5. In particular, only two partial scans of the input image 27 are illustrated, with three correlation calculations being performed for each scan. However, it would be apparent for those skilled in the art from this disclosure that any number of scans of the input image 27 with any number correlation calculations per scan can be made as needed and/or as desired to perform the template matching of the present invention.

As mentioned above, the second input image 27 obtained by the camera 2 captures a vehicle detection area in front of the vehicle 1 which is preferably the same size area as the area of the first input image 26 from which the reference template 30 was created. The scanning range 28 of the input image 27 contains a predetermined number of pixels.

Now in FIG. 5, a first scan of the scanning range 28 of the input image 27 is illustrated by selecting a scanning frame $F_1$ having a predetermined size with a predetermined number of pixels that is smaller than size of the scanning range 28. This scanning frame $F_1$ is used to obtain the extracted portions of the input image 27 that will be compared with the reference template 30 to determine any change in the distance or relative position of the preceding vehicle 10 relative to the vehicle 1. This scanning frame $F_1$ is then sequentially moved across the entire area of the scanning range 28 of the input image 27 one pixel at a time. In other words, the scanning frame $F_1$ is shifted one pixel at a time to different positions within the scanning range 28 of the input image 27 until the entire area or selected portion of the scanning range 28 of the input image 27 is scanned.

At each position in the scanning range 28 of the input image 27, a scanned image $I_1, I_2, I_3, \ldots,$ or $I_n$ is produced from the scanning frame $F_1$. Each scanned image $I_1, I_2, I_3, \ldots,$ or $I_n$ is a portion of the entire scanning range 28 of the input image 27. Each of the scanned images $I_1, I_2, I_3, \ldots,$ and $I_n$ is then either enlarged or reduced to match the size of the reference template 30. Of course, as mentioned above, the reference template 30 can alternatively be enlarged or reduced to match the size of the scanned image. In the illustrated example of FIG. 5, the scanned images $I_1, I_2$ and $I_3$, are enlarged to the enlargement/reduction ratio S2, since the size of the scanning frame $F_1$ that was selected is smaller than size of the reference template 30. On the other hand, when a scanning frame is larger than size of the reference template 30, the scanned images are reduced by a selected enlargement/reduction ratio such that the scanned images match the size of the reference template 30.

Each of the scanned images $I_1, I_2, I_3, \ldots,$ or $I_n$ is then analyzed to determine which of the scanned image contain an image that is the most similar to the image of the reference template 30. In FIG. 5, only three scanned images $I_1, I_2$ and $I_3$, are illustrated from the first scan. Of course, typically, the number of scanned images will depend upon the number of pixels in the scanning range 28 of the input image 27 and the size of the scanning frame $F_1$. Since the scanned images $I_1, I_2, I_3, \ldots,$ or $I_n$ do not closely match the reference template 30, i.e., the correlation values of the scanned images $I_1, I_2, I_3, \ldots,$ or $I_n$ are low, a second scan of the scanning range 28 of the input image 27 is performed with a different size scanning frame as illustrated in FIG. 5.

For example, a second scan of the scanning range 28 of the input image 27 is illustrated in which a scanning frame $F_2$ has been selected that has a predetermined size with a predetermined number of pixels that is smaller than size of the scanning range 28. This scanning frame $F_2$ is sequentially moved across the entire area of the scanning range 28 of the input image 27 one pixel at a time. At each position in the scanning range 28 of the input image 27, a scanned image $I_1', I_2', I_3', \ldots,$ or $I_n'$ is produced from the scanning frame $F_2$. Each scanned image $I_1', I_2', I_3',$ or $I_n'$ is a portion of the entire scanning range 28 of the input image 27. In FIG. 5, only three scanned images $I_1', I_2'$ and $I_3'$ are illustrated. As mentioned above, the number of scanned images will depend upon the number of pixels in the scanning range 28 of the input image 27 and the size of the scanning frame $F_2$. In the illustrated example of FIG. 5, the scanned images $I_1', I_2'$ and $I_3'$ are reduced to the enlargement/reduction ratio S1, since the size of the scanning frame $F_2$ is larger than size of the reference template 30. Each of the scanned images $I_1', I_2', I_3', \ldots,$ or $I_n'$ is then analyzed to determine which of the frame sections contains an image that is the most similar to the image of the reference template 30. Additional scans using different scanning frames are then conducted as needed and/or desired. For example, additional scans can be stop when a correlation value of one or more of the scanned images is above a prescribed value.

Once the scanned image that is the most similar, i.e., the correlation value is the maximum, to the reference template 30 is identified, then the position of the scanned image within the input image 27 is determined based on the x-y coordinate system to obtain a position (xp, yp) in the input image 27. In the illustrated example of FIG. 5, the scanned image $I_2'$, after being reduced by the enlargement/reduction ratio S1, is determined to be the closest match, i.e., the correlation value is the maximum. The position information from the scanned image with highest correlation value can then be compared with the prior position information obtained from the first input image 26. In other words, it is now possible to determine whether the preceding vehicle 10 has shifted its relative position with respect to the original position of the first input image 26 and to determine the amount $\Delta z$, i.e. the relative change in distance between the preceding vehicle 10 and vehicle 1. Thus, from the position of the preceding vehicle 10 in the input image 27 and the enlargement/reduction ratio, the actual position of the preceding vehicle 10 with respect to the vehicle 1 is calculated. In other words, any change in the distance and/or direction of the preceding vehicle 10 can be determined relative to the vehicle 1.

Preferably, the first scanning frame size can be selected based on the size of the reference temple 30 and/or other factors such as a prior determination that the preceding vehicle 10 is getting closer or farther from prior tracking determination. Thus, the number of scans of the input image 27 can be reduced. Likewise, the entire area of the input image 27 does not need to be scanned, if a scanned image, after being enlarged or reduced by an enlargement/reduction ratio is determined to be the closest match, i.e., a correlation value above a predetermined value. Of course, it will be apparent to those skilled in the art from this disclosure that other processing steps can be performed to reduce the processing.

Next, the tracking reliability determining section 106 is configured and arranged to determine the reliability of the template matching executed in the vehicle tracking processing section 105. The maximum correlation value obtained in the vehicle tracking processing section 105 is compared with a prescribed threshold value. If the maximum correlation value is less than or equal to the prescribed threshold value, the template matching (tracking) is determined to be an unacceptable or unreliable. If the maximum correlation value is greater than or equal to the prescribed threshold value, the template matching is determined to be reliable.

When the maximum correlation value is greater than or equal to the threshold value, and thus, when the tracking of the position of the preceding vehicle 10 is determined to be reliable, the processing result outputting section 107 is configured and arranged to determine the position of the preceding vehicle 10 based on the calculation results of the position and enlargement/reduction ratio at which the maximum correlation was obtained. The processing result outputting section 107 is further configured and arranged to output an updated position of the preceding vehicle 10 as a detected position.

In particular, the processing result outputting section 107 is configured and arranged to determine the position (direction and distance) of the preceding vehicle 10 with respect to the vehicle 1 at the point in time when the input image 27 was captured based on the input image 27. More specifically, the direction in which the preceding vehicle 10 exists is calculated based on the position of the preceding vehicle 10 in the input image 27 using Equation 1 in the same manner as when the preceding vehicle 10 is initially detected. The change z(t) in the distance z can be found with Equation 3 using the reciprocal of the enlargement/reduction ratio at which the correlation with respect to the reference template 30 is the maximum.

$$z(t) = wcb * zb / wc(t) \quad \text{Equation 3}$$

In Equation 3, the distance zb is the distance between the vehicle 1 and the preceding vehicle 10 at the point in time when the reference template 30 was created, while the distance z(t) is the distance the distance between the vehicle 1 and the preceding vehicle 10 at the point in time when the input image 27 was captured. Moreover, the vehicle image size wc(t) is the size of the preceding vehicle 10 in the input image 27, and vehicle image size wcb is the size of the preceding vehicle 10 in the reference template 30.

Furthermore, in the preceding vehicle tracking system in accordance with the first embodiment of the present invention, the reference template 30 is updated in the reference template storage memory 109 so that an updated reference template 30' includes only pixels that have been determined to be representing the preceding vehicle 10.

Figure 6:
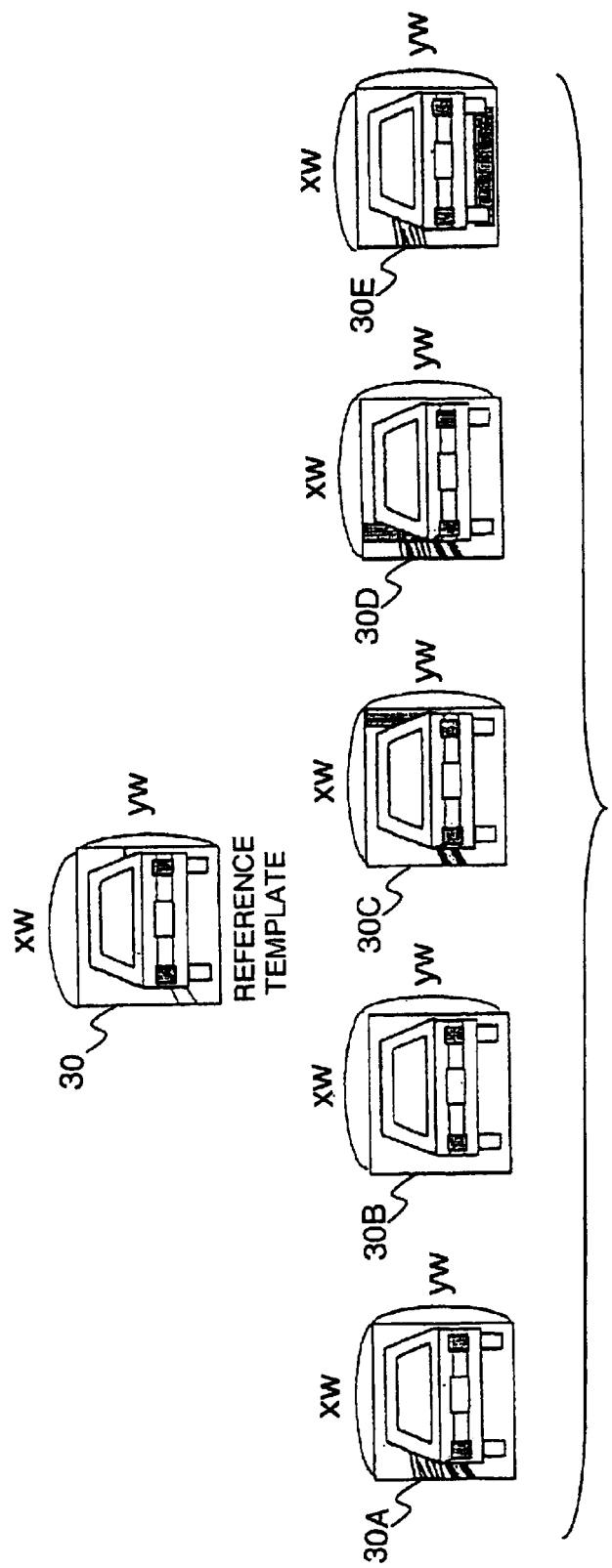
FIG. 6 is a diagrammatic view of the reference template and vehicle images utilized for updating the reference template in the preceding vehicle tracking system in accordance with the first embodiment of the present invention.

More specifically, when the tracking reliability determining section 106 determines that the tracking of the preceding vehicle 10 is reliable because the correlation is high, i.e., when the maximum correlation value is greater than the threshold value, the position of the preceding vehicle 10 in the input image 27 and the enlargement/reduction ratio at which the maximum correlation value is obtained are stored in the vehicle image storage memory 108. Moreover, a vehicle image including the preceding vehicle 10 is also stored in the vehicle image storage memory 108. The vehicle image is an image that is used to calculate the correlation to the reference template 30 as being enlarged or reduced by the enlargement/reduction ratio at which the maximum correlation value was obtained. The vehicle image storage memory 108 preferably configured and arranged to store a plurality of vehicle images created from a plurality of input images obtained by the camera 2 in a consecutive manner. FIG. 6 illustrates the reference template 30 and a plurality of vehicle images 30A–30E stored in the vehicle image storage memory 108 in the consecutive manner. Since these vehicle images 30A–30E stored in the vehicle image storage memory 108 are images that are determined to have a high correlation with respect to the reference template 30, it is highly probable that these vehicle images 30A–30E contain the same preceding vehicle, i.e., the preceding vehicle 10, in the same size as in the reference template 30. However, since these vehicle images 30A–30E are obtained from different input images that are consecutively obtained by the camera 2, these vehicle images 30A–30E have different backgrounds even though the preceding vehicle 10 is identical, as shown in FIG. 6.

Moreover, although the portion where the preceding vehicle 10 is detected has the same form or shape, the brightness of the pixels where the background is photographed may vary consecutively in each of the vehicle images 30A–30E. Accordingly, the reference template updating section 109 of FIG. 1 is configured and arranged to update the reference template 30 in such a manner that the background is deleted so that the updated reference template 30' contains only those pixels representing the vehicle being tracked, i.e. the preceding vehicle 10.

Figure 7:
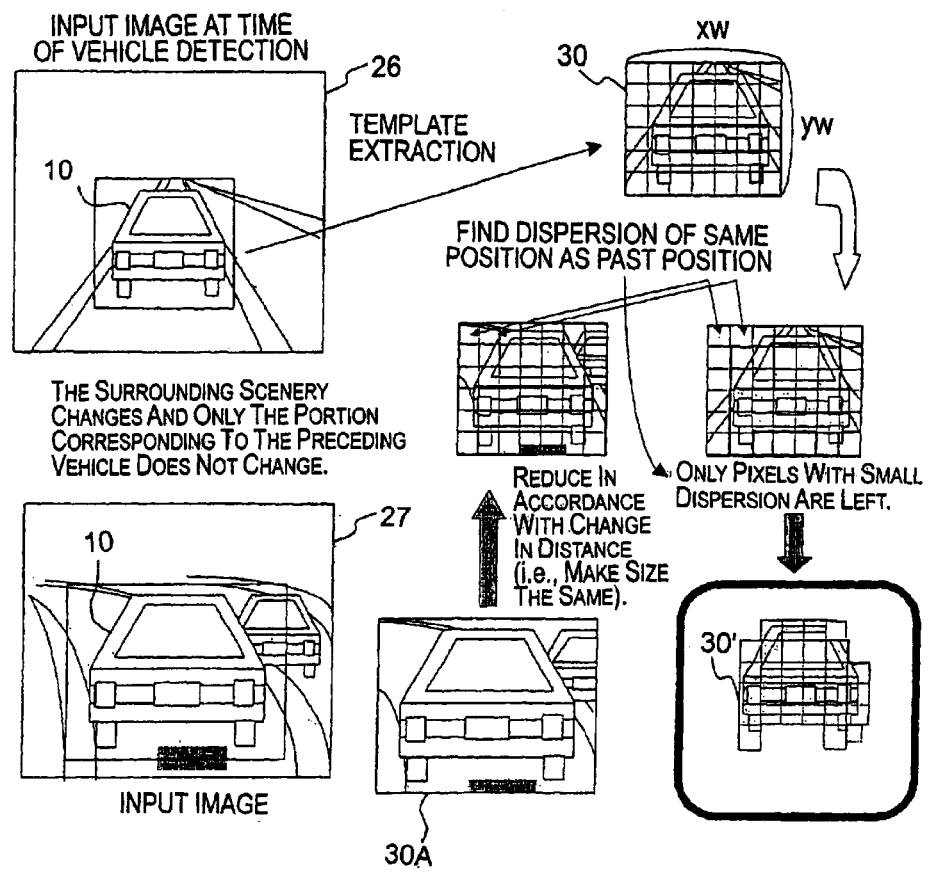
FIG. 7 is a diagrammatic view illustrating a template updating method executed in the preceding vehicle tracking system in accordance with the first embodiment of the present invention in which a dispersion of pixels are calculated in order to leave only the portion of the reference template that represents the preceding vehicle.

FIG. 7 illustrates the processing executed in the reference template updating section 109 for updating the reference template 30 so as to include only the preceding vehicle 10. In the reference template updating section 109, the reference template 30 used at that point in time, which was extracted from the input image 26, is normalized with the plurality of vehicle images 30A–30E that are enlarged or reduced such that the correlation with respect to the reference template 30 is the highest. The normalization serves to accommodate the overall brightness variation of the reference template 30 and the vehicle images 30A–30E. Since these vehicle images 30A–30E have been enlarged or reduced according to the change in distance so as to match the size of the reference template 30, the vehicle images and the reference template all have the same size or x-y dimensions (xw×yw). In FIG. 7, for simplicity, only the vehicle image 30A extracted from the input image 27 will be used to explain the template updating processing executed in the reference template updating section 109.

In the template updating processing, the reference template updating section 109 is configured and arranged to calculate a dispersion of the time series data of a pixel corresponding to the same position in the reference template 30 and the vehicle image 30A for each pixel (total of xw×yw pixels) of the reference template 30. It will be apparent to those skilled in the art from this disclosure that the number of vehicle images used in this processing can be varied as long as the dispersion value can be calculated. For example, using approximately five vehicle images can be sufficient to calculate the dispersion value. The template updating processing is preferably executed in several consecutive processing cycles after the reference template 30 was created by determining a dispersion of each pixel in a consecutively obtained vehicle image and the reference template 30. The pixels whose dispersion is found to be equal to or larger than a prescribed threshold value for a large number of times are determined to be corresponding to the background and not to the preceding vehicle 10. Such pixels are omitted from the reference template 30. Thus, as shown in FIG. 7, pixels forming the background are deleted from the reference template 30, and then the reference template 30 is consecutively updated to the updated reference template 30' that is composed only of those pixels having small dispersion values, i.e., those pixels that form the image of the preceding vehicle 10. After updating the reference template 30, the updated reference template 30' is used to repeat the same correlation processing discussed above. Thus, the tracking processing by the vehicle tracking processing section 105 can be performed by template matching with respect to the updated reference template 30' that does not include the background.

Accordingly, in the preceding vehicle tracking system in accordance with the first embodiment of the present invention, the reference template 30 is first defined and extracted at the position where the preceding vehicle 10 was detected in the input image 26. Then, the vehicle images 30A–30E are extracted at the position where the correlation is the maximum in consecutively obtained input images by enlarging or reducing these input images such that the preceding vehicle 10 in the input image is substantially the same size as in the reference template 30. Next, the vehicle images 30A–30E and the reference template 30 are both normalized, and the dispersion (brightness difference) in the pixels between the reference template 30 and the vehicle images are calculated. Then, the reference template 30 is updated by deleting those pixels in positions where the brightness difference between pixels is large. Therefore, the template matching is conducted using the updated reference template 30' that includes only those pixels that have been determined to have a small dispersion, i.e., those pixels that form the image of the preceding vehicle 10.

Accordingly, the reference template 30 is preferably updated by creating several vehicle images 30A–30E as reference images, instead of being defined in one step using the input image obtained when the preceding vehicle 10 was detected at one point in time. More specifically, the vehicle images 30A–30E are obtained by examining the correlation between the reference template 30 and the extracted portions of the input images 27. Then the reference template 30 is updated by examining the existence or absence of edges in order to ensure that the reference template 30 has a high correlation and contains no more than a certain amount of edge. As a result, the reference template 30 can be updated more accurately so as to contain only features of the preceding vehicle 10. This arrangement allows the preceding vehicle tracking system to track the preceding vehicle 10 by using the updated reference template 30' that includes only features of the preceding vehicle 10 and not the background scenery. As a result, tracking of the preceding vehicle 10 can be conducted without being affected by the edges of the scenery behind the preceding vehicle 10.

Second Embodiment

Referring now to FIG. 8, a preceding vehicle tracking system in accordance with a second embodiment of the present invention will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the preceding vehicle tracking system of the second embodiment of the present invention is identical to the first embodiment, except for the processing used for determining an enlargement/reduction ratio of the extracted portion of the input images 27 during the template matching process executed in the vehicle tracking processing section 105. In particular, in the second embodiment of the present invention, the edges of the preceding vehicle 10 in the input image 27 and the reference template 30 are detected during the correlation calculation that takes into consideration the enlargement or reduction, and the enlargement/reduction ratio of the input image 27 is then determined based on a change in the distance between the edges of the preceding vehicle 10 in the reference template 30 and the input image 27.

Figure 8B:
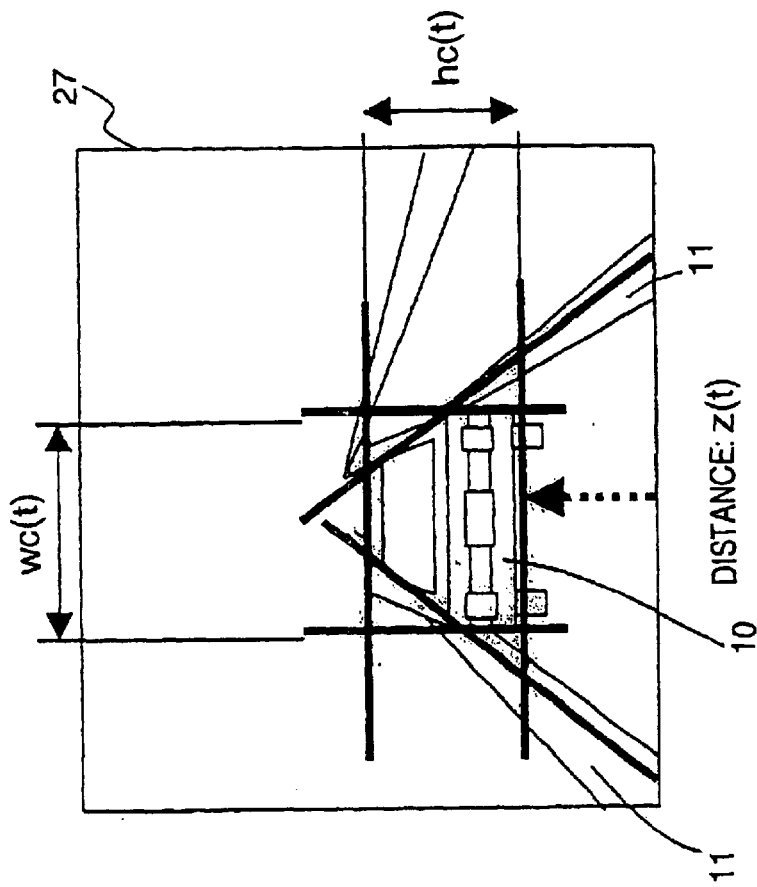
FIG. 8(b) is a diagrammatic view of the input image utilized in the preceding vehicle tracking system in accordance with the second embodiment illustrating together with FIG. 8(a) how to find a size of the preceding vehicle in the input image.
Figure 8A:
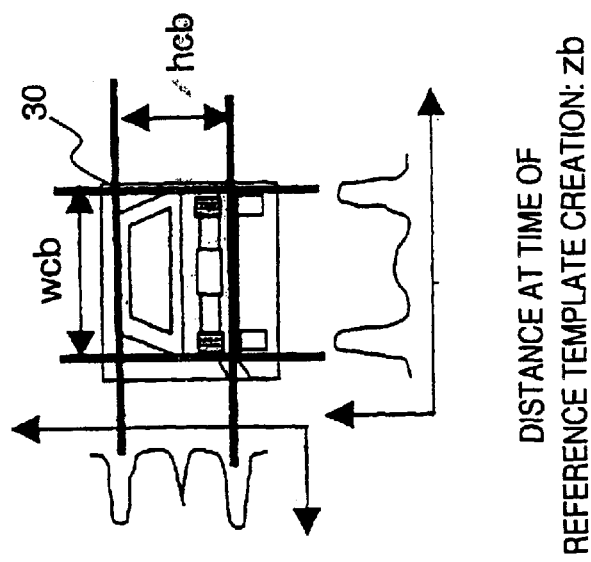
FIG. 8(a) is a diagrammatic view of the reference template utilized in a preceding vehicle tracking system in accordance with a second embodiment of the present invention.

FIG. 8(a) illustrates the reference template 30 obtained from an image taken at the distance zb between the camera lens 23 and the preceding vehicle 10. In the reference template 30, the width of the preceding vehicle 10 is referred to as vehicle width wcb, and the heig.

ht of the preceding vehicle 10 is referred to as vehicle height hcb. FIG. 8(b) illustrates the detection of upper, lower, left, and right edges of the vehicle in the input image 27 taken at the distance z(t) between the camera lens 23 and the preceding vehicle 10. In the input image 27, the width of the preceding vehicle 10 is referred to as vehicle image width wc(t) and the height of the preceding vehicle 10 is referred to as vehicle image height hc(t).

Once the distance z(t) or the amount of change of the distance between the camera lens 23 and the preceding vehicle 10 with respect to the reference template 30 is already known, a single value of the enlargement/reduction ratio employed by the vehicle tracking processing section 105 can be determined using Equations 2 and 3 explained in the first embodiment of the present invention. In other words, the distance hcb between the upper and lower edges of the vehicle 10 in the reference template 30 and the distance wcb between the left and right edges of the preceding vehicle 10 in the reference template 30 are inversely proportional to the distance zb between the camera lens 23 and the preceding vehicle 10 at the point in time the reference template 30 is created. Similarly, the distance hc(t) between the upper and lower edges of the vehicle 10 in the input image 27 and the distance wc(t) between the left and right edges of the preceding vehicle 10 in the input image 27 are inversely proportional to the distance z(t) between the camera lens 23 and the preceding vehicle 10 at the point in time when the input image 27 is captured. Thus, the following relationship is drawn.

$$zb:z(t)=wc(t):wcb=hc(t):hcb.$$

Accordingly, in this second embodiment, the vehicle tracking processing section 105 is configured and arranged to determine the change of the distance wc(t) between the left and right edges or the change of the distance hc(t) between the upper and lower edges of the preceding vehicle 10 in the input image 27 with respect to the distance wcb between the left and right edges or the distance hcb between upper and lower edges in the reference template 30, respectively. Then, the change in the distances wcb and wc(t) or the change in the distances hcb and hc(t) is used to determine the enlargement/reduction ratio of the input image 27 to apply in the processing executed by the vehicle tracking processing section 105.

Thus, in the second embodiment of the present invention, in the correlation calculation in consideration of the expansion or reduction, the edges of the preceding vehicle 10 in the reference template 30 and the input image 27 are both detected. The enlargement/reduction ratio is determined based on the change in the distance between these vehicle edges. In the first embodiment explained above, the enlargement/reduction ratio was unknown, and thus, it is necessary to calculate the correlation for various input images obtained by multiplying by enlargement/reduction ratios corresponding to various potential distance changes, e.g., corresponding to cases in which the size of the vehicle in the image increased, decreased, or stayed the same. In the second embodiment, when enlargement or reduction is applied to accommodate changes in the size of the preceding vehicle 10 in the input image 27 resulting from changes in the distance between the camera lens 23 and the preceding vehicle 10, a single enlargement/reduction ratio is determined based on the change in size of the preceding vehicle 10 in the reference template 30 and the input image 27. Consequently, it is sufficient to a single scan of the input image 27 by applying only one enlargement/reduction ratio to the extracted portions of the input image 27, and then find correlation values in a scanning range located in the vicinity of the position where the preceding vehicle 10 was detected in a previous image of tracking processing. As a result, the amount of correlation calculations executed by the vehicle tracking processing section 105 can be reduced. Moreover, the change of the size of the preceding vehicle 10 in the input image 27 can be confirmed. Thus, the reliability can be increased by comparing the correlation value when enlargement or reduction has been applied and the enlargement/reduction ratio determined based on the distance between the edges.

Third Embodiment

Figure 9:
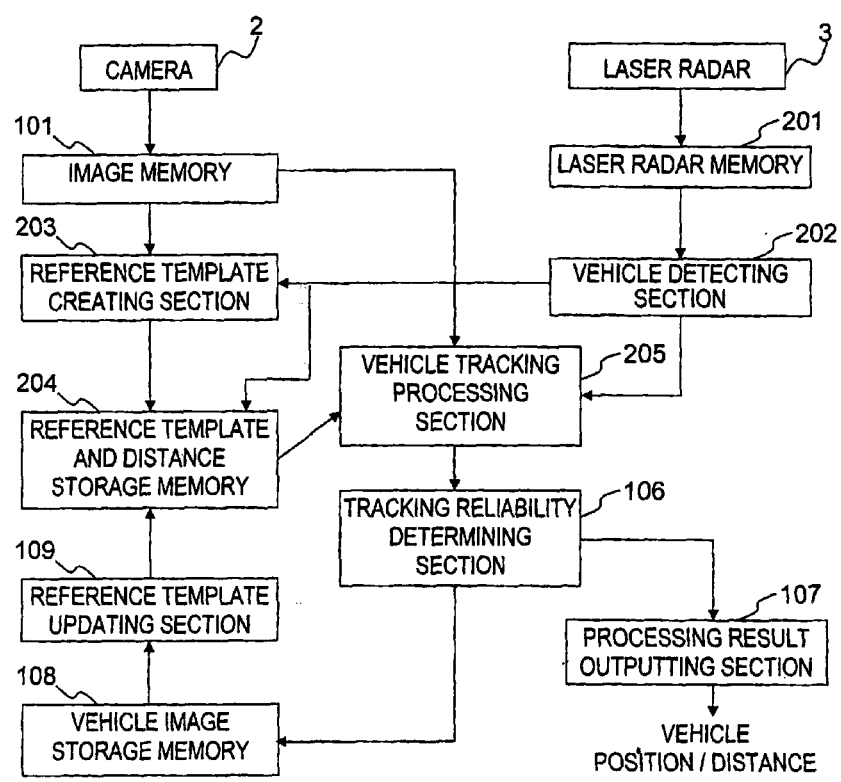
FIG. 9 is a block diagram illustrating a preceding vehicle tracking system in accordance with a third embodiment of the present invention.
Figure 10:
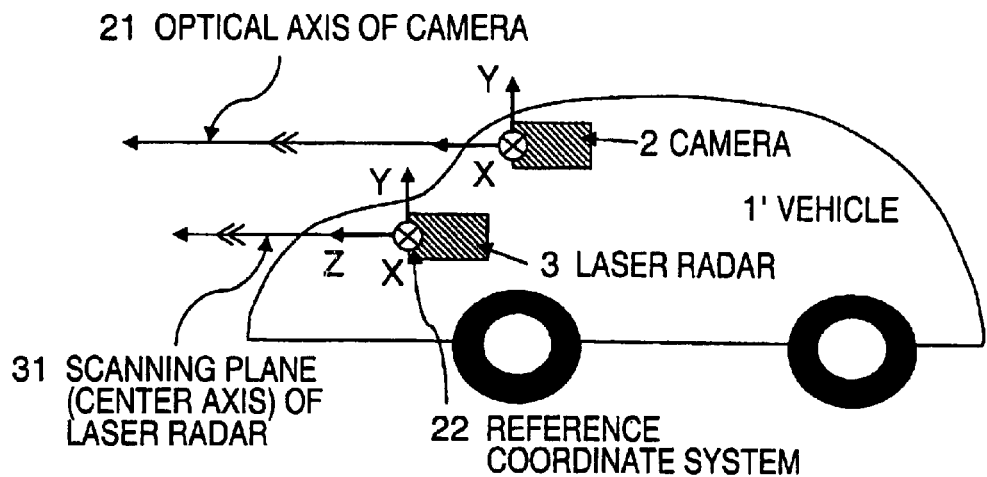
FIG. 10(a) is a schematic side view of a vehicle with a camera, a laser radar and a reference coordinate system of the preceding vehicle tracking system in accordance with the third embodiment of the present invention.
FIG. 10(b) is a schematic top plan view of the vehicle illustrated in FIG. 10(a) with the preceding vehicle tracking system in accordance with the third embodiment of the present invention.
Figure 10:
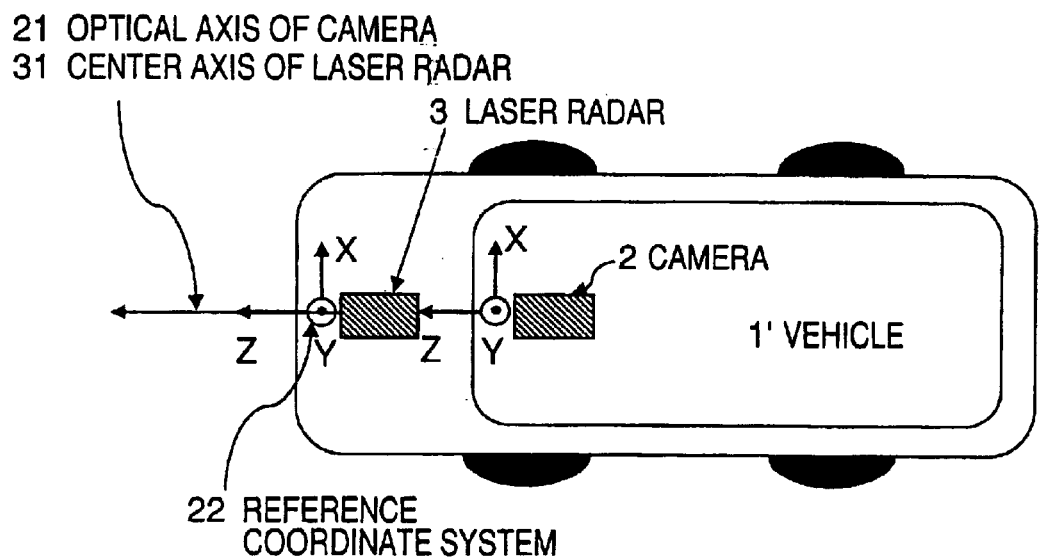

Referring now to FIGS. 9–11, a preceding vehicle tracking system in accordance with a third embodiment of the present invention will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The preceding vehicle tracking system in accordance with the third embodiment of the present invention differs from the first embodiment in that the preceding vehicle tracking system of the third embodiment is provided with a distance measuring sensor or device that is configured to measure a distance between a vehicle 1' equipped with the preceding vehicle tracking system and the preceding vehicle 10 using a laser or other distance measuring device. The distance measuring sensor is preferably a laser radar. Of course, it will be apparent to those skilled in the art from this disclosure that the distance measuring sensor can be any device or combination of devices that is adapted to measure the distance between the vehicle 1' and the preceding vehicle 10.

FIG. 9 shows a block diagram of the preceding vehicle tracking system in accordance with the third embodiment of the present invention. The preceding vehicle tracking system in accordance with the third embodiment basically comprises the camera 2, the image memory or storage section 101, a distance measuring sensor or a scanning laser radar 3 (hereinafter called "laser radar 3"), a laser radar memory or storage section 201, a vehicle detecting section 202, a reference template creating section 203, a reference template and distance storage memory or storage section 204, a vehicle tracking processing section 205, the tracking reliability determining section 106, the processing result outputting section 107, the vehicle image storage memory or storage section 108, and the reference template updating section 109.

FIGS. 10(a) and 10(b) illustrates the vehicle 1' equipped with the preceding vehicle tracking system in accordance with the third embodiment of the present invention. As seen in FIGS. 10(a) and 10(b), the camera 2 and the laser radar 3 are mounted on the vehicle 1' that is equipped with the preceding vehicle tracking system of this third embodiment of the present invention. The laser radar 3 has a scanning plane 31 (center axis). The laser radar 3 is mounted such that its center axis 31 is parallel to the optical axis 21 of the camera 2, as seen in FIGS. 10(a) and 10(b). The camera 2 is configured and arranged to obtain image data, and output the image data to the image memory 101. The laser radar 3 is configured and arranged to obtain distance data, and output the distance data to the laser radar memory 201. More specifically, the laser radar 3 is configured and arranged to scan in a one-dimensional manner in a direction parallel to the road surface. Thus, the laser radar 3 is configured and arranged to detect the preceding vehicle 10, and measure the distance between the vehicle 1' and the preceding vehicle 10.

In FIG. 9, the processing sections that process the input image obtained by the camera 2 (the image memory 101, the tracking reliability determining section 106, the processing result outputting section 107, the vehicle image storage memory 108, and the reference template updating section 109) are identical to those parts with the same reference numerals in the first embodiment, and thus, will not be discussed in detail for the sake of brevity. Accordingly, the processing sections that utilize distance information obtained by the laser radar 3 (the laser radar memory 201, the vehicle detecting section 202, the reference template creating section 203, the reference template and distance storage memory 204, and the vehicle tracking processing section 205) will now be described.

The laser radar memory 201 is a storage device that is configured and arranged to store distances to the preceding vehicle 10 detected by the laser radar 3. The laser radar 3 is preferably configured to irradiate light to an object and measure the distance to the reflective object by measuring the time until the reflected light is received.

FIG. 11(a) shows the position of the laser radar 3 when it measures the distance to a preceding vehicle 10A and/or 10B. FIG. 11(b) illustrates an input image 26' in the forward direction of the vehicle captured by the camera 2 at the same point in time shown in FIG. 11(a).

In FIG. 11(a), an arrow 32 indicates the speed of the vehicle 1', while the other arrows indicate relative speeds with respect to the speed of the vehicle 1', and dots ○ indicate measurement points of the laser radar 3. In this example, the laser radar 3 encompasses in its detection angle 33 the preceding vehicles 10A and/or 10B and a reflective object 35 on the road.

Normally light-reflecting reflector plates called "reflex reflectors" are attached to the rear part of the preceding vehicles 10A and/or 10B. Thus, the distance from the laser radar 3 to the vehicles 10A and/or 10B is measured using the light reflected from these reflector plates.

Based on the measurement results of the laser radar 3, i.e., the distribution of the measurement points shown in FIG. 11(a), the vehicle detecting section 202 is configured and arranged to detect the preceding vehicles 10A and/or 10B. More specifically, the vehicle detecting section 202 is configured and arranged to measure the direction of the preceding vehicles 10A and/or 10B with respect to the vehicle 1' and the distance between the preceding vehicles 10A and/or 10B and the vehicle 1'. This processing is preferably performed by detecting at an interval approximately equal to the width of the preceding vehicles 10A and/or 10B and finding the two left and right points that move in the same direction in a time series manner, as shown in FIG. 11(a). In other words, it is determined that the preceding vehicles 10A and/or 10B are detected when two pairs of laser radar measurement points ○ move at the same speed and travel at a relative velocity. On the other hand, a stationary object such as the reflective object 35 is determined to be stationary by detecting that it moves toward the vehicle at the same speed as the speed 32 of the vehicle 1'.

Based on the position and distance of the preceding vehicles 10A and/or 10B detected by the vehicle detecting section 202, the reference template creating section 203 is configured and arranged to define reference templates at the positions in the input image 26' captured by the camera 2 that corresponds to the position of the preceding vehicles 10A and/or 10B. The direction and distance of the preceding vehicles 10A and/or 10B with respect to the vehicle 1' is provided by the laser radar 3 in this preceding vehicle tracking system. Therefore, by substituting the direction and distance in Equations 1 and 2, the positions of the preceding vehicles 10A and/or 10B in the input image 26', which is photographed by the camera 2, can be determined. However, when the laser radar 3 that scans one-dimensionally is used, the heights of the preceding vehicles 10A and/or 10B are unknown. The positioning of the reference template in the input image 26' in the height or vertical direction can be determined, for example, as in the second embodiment, by detecting the horizontal edges that indicate the upper and lower vehicle edges that exist in the direction where the preceding vehicles 10A and/or 10B exist, and thereby finding the positions of the preceding vehicles 10A and/or 10B in the height direction in the input image 26'.

The reference template and distance storage memory 204 is a memory storage device for storing reference templates containing the preceding vehicles 10A and/or 10B photographed in input image 26' that were defined by the processing executed by the reference template creating section 203. Here, since the distances of the preceding vehicles 10A and/or 10B with respect to the vehicle 1' when the reference template is created are measured by the laser radar 3, these distances are also stored in the reference template and distance storage memory 204 at the same time. These distances are used in the next processing stage executed by the vehicle tracking processing section 205.

After the preceding vehicles 10A and/or 10B are detected, the vehicle tracking processing section 205 is configured to track the preceding vehicles 10A and/or 10B. The tracking uses both updated distance measurement results from the laser radar 3 and template matching conducted by matching input images obtained by the camera 2 with the reference template while enlarging or reducing the input images taking into consideration of the change in size of the preceding vehicles 10A and/or 10B in the input images. The tracking performed by the laser radar 3 can be handled with processing similar to the processing used for initially detecting the preceding vehicles 10A and/or 10B by the laser radar 3.

More specifically, the vehicle tracking processing section 205 is configured and arranged to conduct template matching using an enlargement/reduction ratio calculated from updated distance measured by the laser radar 3 and the distance measured when the reference template was created that is stored in the reference template and distance storage memory 204. In other words, the vehicle tracking processing section 205 is configured and arranged to conduct the template matching in which subsequent input images from the camera 2 are matched with the reference template based on correlation values calculated while enlarging or reducing the input image to take into consideration the change in the distance between the preceding vehicles 10A and/or 10B and the vehicle 1'. The enlargement/reduction ratio used during this template matching is determined based on the ratio of the distance to the preceding vehicles 10A and/or 10B measured at that particular point in time by the laser radar 3 to the distance measured at the point in time when the reference template was created.

The methods of calculating the direction and the distance, calculating the correlation, and determining the reliability are the same as in the first embodiment. The distances of the preceding vehicles 10A and/or 10B used in the processing are preferably the distances measured by the laser radar 3. The direction of the preceding vehicles 10A and/or 10B with respect to the vehicle 1' can be determined more precisely using image processing as explained in the first embodiment. Therefore, the positions of the preceding vehicles 10A and/or 10B with respect to the vehicle 1' can be determined accurately by using the distances measured by the laser radar 3 and the directions in which the vehicles 10A and/or 10B were detected as determined by using the template matching based on image processing.

Accordingly, in the preceding vehicle tracking system in accordance with the third embodiment of the present invention, not only is the positions of the preceding vehicles 10A and/or 10B being tracked are determined in the input image 26' obtained from the camera 2 but also the three-dimensional distance and position in the transverse direction can be measured by the laser radar 3. Furthermore, when the input images are enlarged or reduced for the correlation calculation, a single enlargement/reduction ratio is calculated from absolute distances measured by the laser radar 3. Thus, the amount of the calculations can be reduced.

Moreover, even if the preceding vehicles 10A and/or 10B cannot be tracked by the input images obtained by the camera 2 for a prescribed period of time due to, for example, fog or the backlighting (photographing an image against light), the laser radar 3 can still measure the distance between the preceding vehicles 10A and/or 10B and the vehicle 1'. Therefore, the preceding vehicles 10A and/or 10B can be effectively tracked using the results from both the camera 2 and the laser radar 3. Furthermore, using the results from both the camera 2 and the laser radar 3 enables the system to perform the template matching using the reference template that was created when the conditions of the input image were relatively good. In conventional template matching, on the other hand, in which the reference template is updated consecutively in order to accommodate size changes of an object being tracked, if the input image of the preceding vehicle 10 becomes unclear due to backlighting or shadows, the reference template used for defining new templates will also contain backlighting or shadows and become unclear. Thus, in the conventional system, reference templates will be created for the system to track portions of the images that include details other than the vehicle itself. As a result, the correlation used for tracking will be low and the system will not be able to detect the preceding vehicle correctly. One feasible way to avoid this problem is to update the reference template only when the correlation is high. However, backlighting, which easily causes problems when executing image processing using the camera 2 mounted on a vehicle, is often continuous for a prescribed amount of time or longer so long as the direction in which the vehicle is traveling does not change relative to the source of the backlighting. In short, if the reference template is not updated for a long time during the period when there is backlighting, then when the backlighting ends, the size of the vehicle may have changed greatly in comparison with when the backlighting first began because the distance between the vehicles may have changed. This is a problem because the stored reference template will no longer be applicable. In the preceding vehicle tracking system in accordance with the third embodiment, since the distance information obtained with the laser radar 3 can be used, a reference template created when the image quality was good can be used. In other words, since these adverse conditions do not affect measurements by the laser radar 3, a previously stored reference template having similar measurements by the laser radar 3 can be used when the image quality is poor.

Moreover, the enlargement/reduction ratio for the reference template can be determined based on the relationship between the distance at the point in time when the reference template was created and the distance at the point in time when the quality of the new image improved. As a result, template matching that takes into consideration the enlargement or reduction of the vehicle image can be conducted using good quality reference templates.

Also, when the template matching based on image processing is used to measure the positions of the preceding vehicles 10A and/or 10B with pixel-level precision, it can normally measure the direction of the preceding vehicles 10A and/or 10B with higher level of precision than the laser radar 3 can. Thus, the third embodiment of the present invention can measure both the distance and the direction with higher level of precision by measuring the distance with the laser radar 3 and the direction by using template matching based on image processing.

Fourth Embodiment

Figure 12:
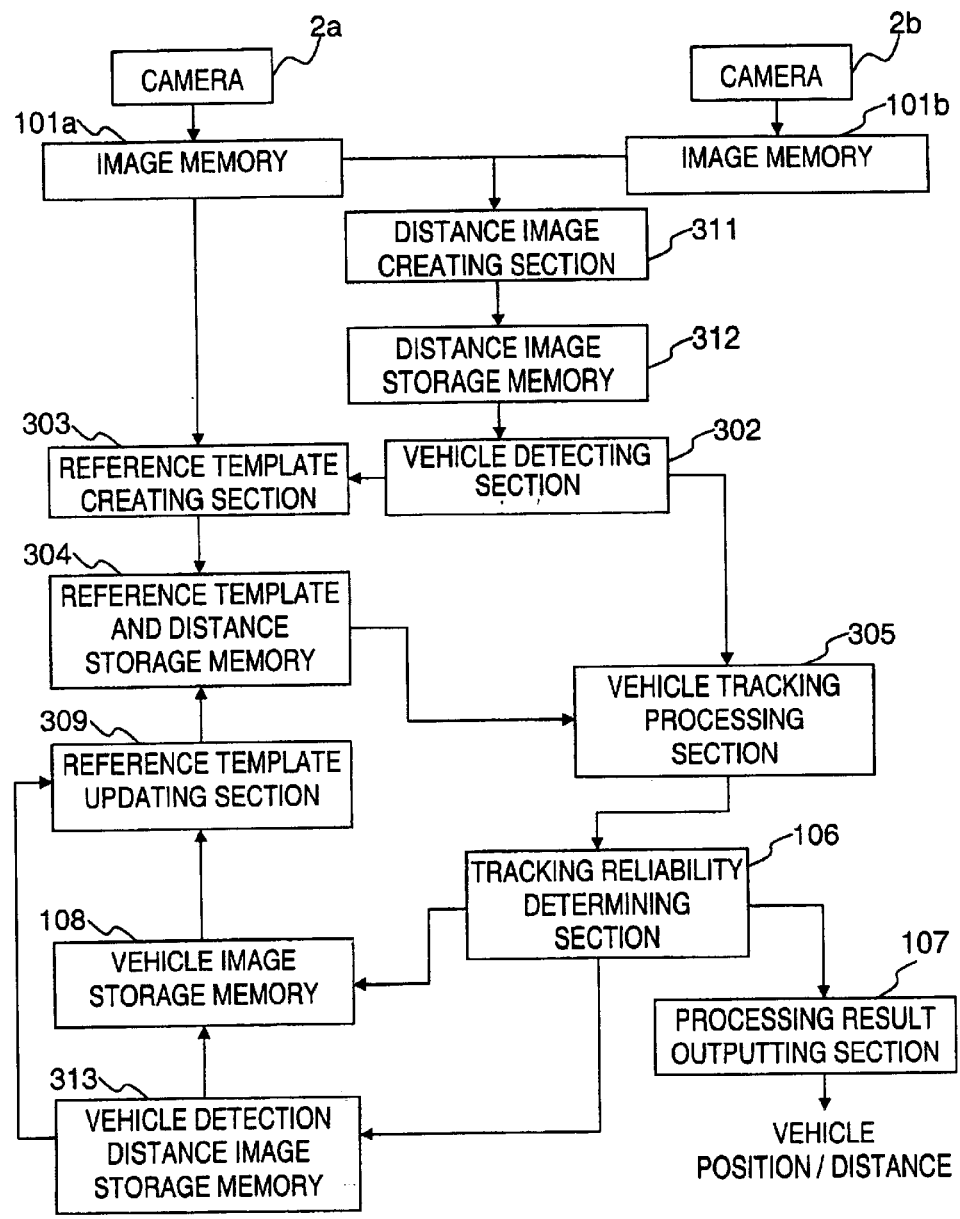
FIG. 12 is a block diagram illustrating a preceding vehicle tracking system in accordance with a fourth embodiment of the present invention.
Figure 13:
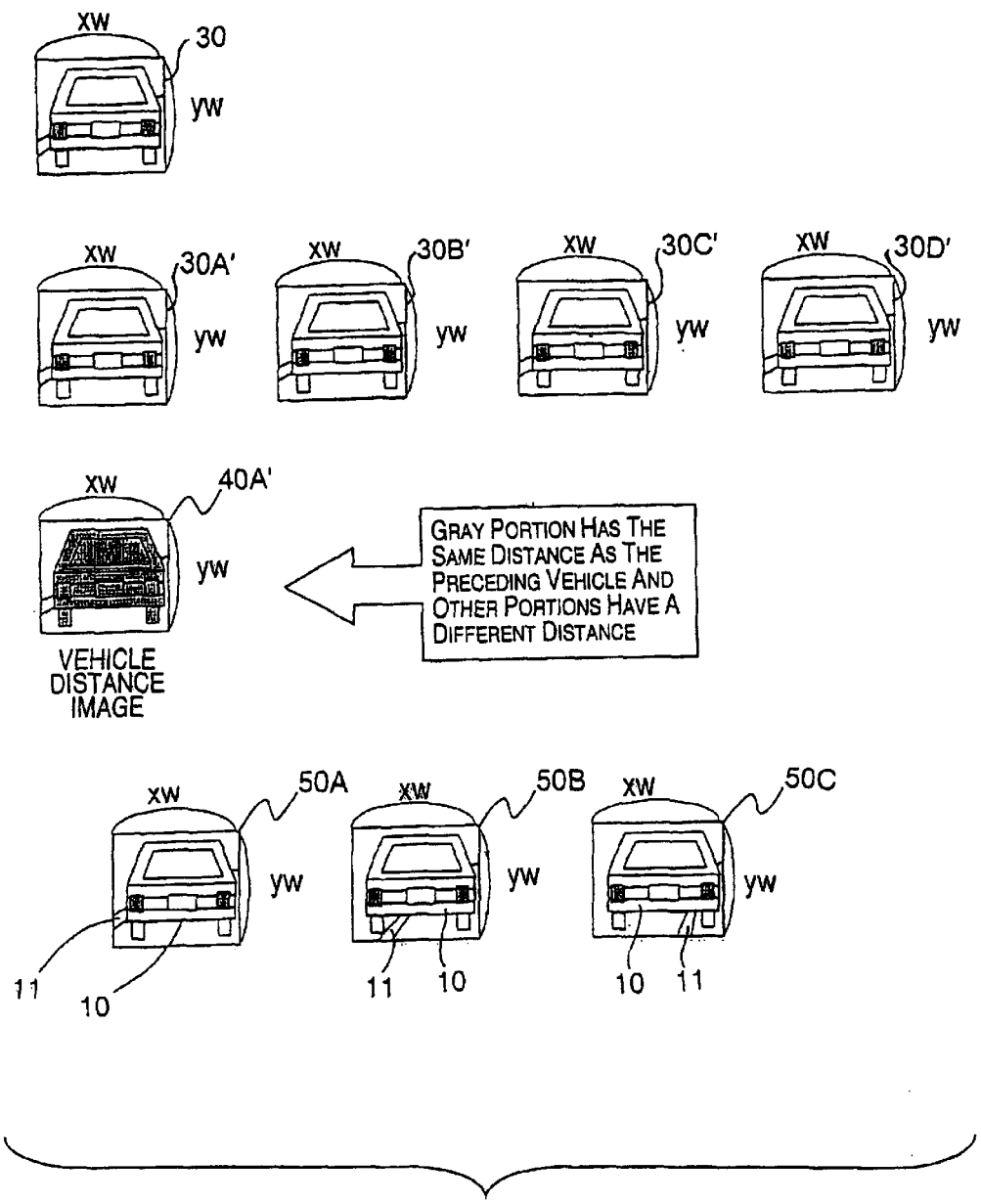
FIG. 13 is a diagrammatic view of a reference template, vehicle images and a distance image utilized in the preceding vehicle tracking system in accordance with the fourth embodiment of the present invention.

Referring now to FIGS. 12 and 13, a preceding vehicle tracking system in accordance with a fourth embodiment of the present invention will now be explained. In view of the similarity between the first, second, third and fourth embodiments, the parts of the fourth embodiment that are identical to the parts of the first, second and third embodiments will be given the same reference numerals as the parts of the first, second and third embodiments. Moreover, the descriptions of the parts of the fourth embodiment that are identical to the parts of the second and third embodiment may be omitted for the sake of brevity.

Basically, the preceding vehicle tracking system in accordance with the fourth embodiment differs from the first embodiment in that two cameras 2a and 2b in stereoscopic are used instead of using a single camera and a distance image obtained based on the stereoscopic cameras 2a and 2b is used to track a preceding vehicle.

FIG. 12 is a block diagram illustrating the preceding vehicle tracking system in accordance with the fourth embodiment of the present invention. The preceding vehicle tracking system of the fourth embodiment basically comprises first and second cameras 2a and 2b, first and second image memories or storage sections 101a and 101b, a distance image creating section 311, a distance image storage memory or storage section 312, a vehicle detecting section 302, a reference template creating section 303, a reference template and distance storage memory or storage section 304, a vehicle tracking processing section 305, the tracking reliability determining section 106, the processing result outputting section 107, a vehicle detection distance image storage memory or section 313, the vehicle image storage memory or section 108, and a reference template updating section 309.

Descriptions of constituent features in the fourth embodiment that are the same as in the first and third embodiments are omitted and only the additional sections related to the stereoscopic cameras (sensor configuration) are described, i.e., the distance image creating section 311, the distance image storage memory 312, the vehicle detecting section 302, the vehicle detection distance image storage memory 313, and the reference template updating section 309.

In this embodiment, the image memories 101a and 101b are preferably provided to store images taken by the first and second cameras 2a and 2b, respectively. Of course, it will be apparent to those skilled in the art from this disclosure that the image memories 101a and 101b can be arranged to be a single memory section that stores the input images from both of the first and second cameras 2a and 2b. Using the images stored in the image memories 101a and 101b, the distance image creating section 311 is configured and arranged to execute distance image creation processing to obtain a distance image. The distance image is an image with at least one pixel with a distance value obtained based on two images (first and third images) simultaneously captured by the first and second cameras 2a and 2b, respectively. The distance value associated with each pixel is calculated based on the photographed positional difference, i.e., parallax, between the first and third images. For example, the parallax with respect to an object in the first and third images can be determined by defining a region that comprises a certain number of pixels wide by a certain number of pixels high in the third image and detecting a region of the first image where the same-shaped portion as the region in the third image is photographed. The detection of the same shaped portion in the first and third images can be achieved by, for example, using normalization and correlation. The parallax between the first and third images with respect to each pixel of the third image is calculated while shifting one pixel at a time until the processing has been performed for all pixels of the third image. Thus, the distance image that includes each parallax between the first and third images for each pixel in the third image is obtained. When a distance between the first and second cameras 2a and 2b is constant, the parallax between the first and third images with respect to the object is inversely proportional to the distance between the object and the first and second cameras 2a and 2b. Accordingly, the parallax of the each pixel in the third image can be converted to the distance value, and thus, the distance image is obtained. The distance image created in the distance image creating section 311 is stored in the distance image storage memory 312.

Next, the vehicle detecting section 302 is configured and arranged to detect the preceding vehicle 10 using the distance image. The processing of detecting the preceding vehicle 10 can be accomplished, for example, by using the method described in Japanese Laid-Open Patent Publication No. 11-345336. The processing described in this publication detects a preceding vehicle by finding regions in which the distance is the same for each x-coordinate. Since the distance will be the same throughout the region where the preceding vehicle 10 is photographed, the preceding vehicle 10 can be detected as a region containing an agglomerate of pixels indicating the same distance. Thus, the distance indicated by those pixels is determined to be the distance between the preceding vehicle 10 and the first and second cameras 2a and 2b (i.e., the vehicle 1).

Next, the reference template creating section 103 is configured and arranged to create the reference template 30 based on the results of the detection of the preceding vehicle 10. The reference template 30 is preferably created using the first image stored in the first image memory 101a. More specifically, the reference template 30 is extracted from the first image at the position corresponding to where the preceding vehicle 10 was detected based on the distance image.

Since the distance to the preceding vehicle 10 can be obtained based on the stereoscopic image processing, the distance to the preceding vehicle 10 at the point in time when the reference template 30 was created is calculated by the stereoscopic image processing, similarly to the third embodiment with the camera 2 and the laser radar 3. The distance calculated is stored along with the reference template 30 in the reference template and distance storage memory 304. Thus, when the vehicle tracking processing section 305 performs template matching by enlarging or reducing the input image 27, a single enlargement/reduction ratio is predetermined in each processing cycle based on the distance between the vehicle 1 and the preceding vehicle 10 at the point in time when the reference template 30 was created and the distance between the vehicle 1 and the preceding vehicle 10 at the time of the current processing cycle. The distance between the vehicle 1 and the preceding vehicle 10 at the point in time when the reference template 30 was created is easily determined. The distance between the vehicle 1 and the preceding vehicle 10 at the time of the current processing cycle has been calculated by stereoscopic image processing of the input image 26 and a corresponding input image obtained by the second camera 2b. The reference template and distance storage memory 304 and the vehicle tracking processing section 305 include basically the same function as the reference template and distance storage memory 204 and the vehicle tracking processing section 205 in the third embodiment discussed above. Thus, the vehicle tracking processing section 205 is configured and arranged to execute template matching processing using a single enlargement/reduction ratio that is determined in accordance with the ratio of the two distances, i.e., the distance at the point in time when the reference template was created and the distance at the point in time when the input image was inputted.

Next, if the tracking reliability determining section 106 determines that the tracking is reliable as explained in the first embodiment, the processing result outputting section 107 is configured and arranged to output the distance and direction of the preceding vehicle 10. Also, the vehicle images for updating the reference template are stored in the vehicle image storage memory 108. The storage of the vehicle images in the vehicle image storage memory 108 is conducted in the same manner as in the first embodiment.

FIG. 13 shows the reference template 30 stored in the reference template and distance storage memory 304 and the vehicle images 30A'-30D' stored in the vehicle image storage memory. Additionally, in this fourth embodiment, simultaneously with the storage of the vehicle images 30A'-30D', vehicle distance images 40A'-40D' (only a vehicle distance image 40A' is shown) are obtained and stored. More specifically, the vehicle distance images 40A'-40D' are images extracted from distance images that correspond to the input images from which the vehicle images 30A'-30D' are extracted. The same enlargement/reduction ratios are applied to the distance images as were used by the vehicle tracking processing section 205 to the corresponding input images to obtain the vehicle images 30A'-30D' in positions of the distance images corresponding to the vehicle images 30A'-30D' in the input images. As seen in FIG. 13, the gray portion of the vehicle distance image 40A' indicates the portion has the same distance as the preceding vehicle 10, while the other portions have a different distance. The vehicle distance images 40A'-40D' are stored in the vehicle detection distance image storage memory 313. In the template updating processing executed by the reference template updating section 309, the vehicle distance images 40A'-40D' are used to determine whether each pixel of the vehicle images 30A'-30D' includes the same distance corresponding to the preceding vehicle 10 in addition to the evaluation of dispersion of the each pixel as explained in the first embodiment. Thus, those pixels of the reference template 30 whose dispersion is high and whose distance value is different from that of the preceding vehicle 10 are eliminated from the reference template 30 to obtain an updated reference template that is more effectively corresponding to the preceding vehicle 10.

As explained in the first embodiment, the reference template 30 and the vehicle images 30A'-30D' in FIG. 13 are images based on brightness that are stored in the vehicle image storage memory 108. Moreover, template matching images 50A-50C are examples of the images that are used to track the preceding vehicle 10 by template matching with the reference template 30. As seen in FIG. 13, the template matching images 50A-50C are based on input images consecutively obtained while the preceding vehicle 10 is changing the lane. For example, when the reference template 30 is updated in the reference template updating section 309, while the preceding vehicle 10 is traveling along a straight line and maintaining the same positional relationship to the white line 11, the vehicle images 30A'-30D' used for template matching, i.e., the images stored in the vehicle image storage memory 108, are all the same including the portion where the white line 11 exists as well as the portion where the preceding vehicle 10 exists. Therefore, an updated reference template 30 will also include the white line 11. When template matching is conducted using the reference template 30 that include the white line 11 because they are created by updating the reference template 30 using only the vehicle images 30A'-30D' in the vehicle image storage memory 108, the position can be measured correctly so long as the vehicle 10 is continuously traveling on a straight road. However, if the preceding vehicle 10 changes lanes or some other change occurs in the positional relationship between the vehicle 10 and the white line 11, i.e. the position of the white line 11 in the input images changes, as shown in the template matching images 50A-50C in FIG. 13, the correlation value between the reference template 30 and the images 41a-41c will decline because the reference template 30 was created and updated so as to include the white line 11. This problem can be corrected by using the distance images 40A'-40D' which do not include the white line 11.

In the distance images 40A'-40D', the distance value of the white line 11 portion is different from the distance value of the preceding vehicle 10 because the white line 11 is positioned in front of or in back of the vehicle 10. Therefore, by including the difference in a distance value in each pixel based on the vehicle images 40A'-40D' in consideration for updating the reference template 30, the reference template 30 is updated such that it only includes the image that corresponds to the preceding vehicle 10 even when the reference template 30 and the vehicle images 30A'-30D' are input while the positional relationship between the preceding vehicle 10 and the white line 11 stays constant. Accordingly, in the preceding vehicle tracking system in accordance with the fourth embodiment of the present invention, the reference template 30 is updated such that it more accurately indicates only the preceding vehicle 10.

Accordingly, for example, when the white line 11, a side wall or rail is continuously photographed in approximately the same position as the preceding vehicle 10, the preceding vehicle 10 and these background scenery (white line 11, a side wall or rail) contains the same brightness. However, the distance with respect to these portions of the background is different from the distance with respect to the preceding vehicle 10. Thus, in the preceding vehicle tracking system in accordance with the fourth embodiment, the preceding vehicle 10 can be effectively separated from the portions of the background and only those pixels that correspond to the preceding vehicle is remained by leaving the pixels corresponding to the distance of the preceding vehicle 10. In short, the fourth embodiment makes it possible to create a reference template that indicates only the preceding vehicle 10 in a more accurate manner.

Fifth Embodiment

Referring now to FIG. 14, a fifth embodiment will be described in accordance with the present invention. The fifth embodiment is directed to an alternate way of performing template matching and creating the reference template in each of the previously described embodiment. Thus, the processing used in the reference template creating sections 103, 203 and 303, the processing used in the vehicle tracking processing sections 105, 205 and 305, and the processing used in the reference template updating sections 109 and 309 as described in the first, second, third and fourth embodiments, respectively, can each be modified to use different images in accordance with this fifth embodiment. Since this fifth embodiment is merely modifying the processing of the images, the drawings and descriptions of the first to fourth embodiments will be used to explain this embodiment. In other words, the descriptions of the processing of the reference template creating sections 103, 203 and 303 and all other sections of the prior embodiments that are identical to the processing in this fifth embodiment will be omitted for the sake of brevity. Similarly, the descriptions of the processing of the vehicle tracking processing sections 105, 205 and 305 of the prior embodiments that are identical to the processing in this fifth embodiment may be omitted for the sake of brevity. Also, the descriptions of the processing of the reference template updating sections 109 and 309 that are identical to the processing in this fifth embodiment may be omitted for the sake of brevity.

Thus, in this fifth embodiment, the programming of the reference template creating sections 103, 203 and 303 are configured and arranged to create a reference template by using differential images. The programming of the vehicle tracking processing sections 105, 205 and 305 are configured and arranged to perform the template matching the reference template created based on the differential images. The programming of the reference template updating sections 109 and 309 are configured and arranged to update the reference template created based on the differential images.

Differential images are preferably created by using such processing as applying a first Sobel filter for detecting vertical edges in the input images and a second Sobel filter for detecting horizontal edges in the input images. The Sobel filters are preferably provided between the image memory 101 (or between the first and second image memories 101a and 101b) and the camera 2 (or the first and second cameras 2a and 2b) such that differential images are constantly fed to the image memory 101 (or the first and second image memories 101a and 101b). Of course, it will be apparent to those skilled in the art from this disclosure that other differential image creating devices can be used to provide a differential image to carry out the present invention.

FIG. 14 shows a differential image reference template 37 and an updated differential image reference template reference template 37' created by updating using the differential image 37. Also, FIG. 14 shows the reference template 30 and the updated reference template 30' that are a brightness image as explained in the previous embodiments. In using the processing of this fifth embodiment, the reference template creating sections 103, 203 and 303 of the prior embodiments are configured and arranged to obtain the differential image reference template 37 based on an input image in which only the image portions with edges will be used. In using the processing of this fifth embodiment, the vehicle tracking processing sections 105, 205 and 305 are configured and arranged to execute correlation processing in consideration of the enlargement or reduction using the differential image 37 of the input image. Moreover, the reference template updating sections 109 and 309 are configured and arranged to update the differential image reference template to an updated differential image reference template 37'. Thus, the differential image reference template 37 is created and updated, and template matching is executed using only the image portions that include edges, which indicate the distinguishing features of the preceding vehicle 10.

Since a vehicle body normally does not have edges or texture, a pixel that represents a part of the vehicle body of the preceding vehicle 10 has the same value as the surrounding pixels when template matching of the preceding vehicle 10 is conducted. In other words, the correlation value does not change much even if the correlation is calculated for a position that is somewhat out of alignment with the preceding vehicle 10. Therefore, the reference template creating sections 103, 203 and 303, the vehicle tracking processing sections 105, 205 and 305, and the reference template updating sections 109 and 309 are configured and arranged in this embodiment to execute the alternate processing that uses differential images so that template matching is performed using only pixels that correspond to an edge or a place where there is texture. When stereoscopic image processing is conducted as in the fourth embodiment (see FIG. 12), the parallax cannot be calculated for image portions where there is no texture or edge, e.g., portions representing the vehicle body of the preceding vehicle 10. Consequently, it is not necessary to determine the correlation and the distance value of image portions where there is no texture when updating the reference template 37 using the distance image. Furthermore, the pixels in the image portions where there is no texture or edge are highly likely to give incorrect distance results due to parallax measurement error. Therefore, using the differential image reference template 37 to update to the updated differential image reference template 37' can prevent the ill effects of such parallax measurement error in the fourth embodiment.

Accordingly, the reference template creating sections 103, 203 and 303, the vehicle tracking processing sections 105, 205 and 305, and the alternate reference template updating sections 109 and 309 of this fifth embodiment make it possible to conduct template matching while excluding those pixels which do not provide any information regarding the body surface, i.e., those pixels for which the corresponding position cannot be calculated during template matching and the parallax cannot be calculated by using stereoscopic image processing. As a result, the calculation amount can be reduced and the more reliable template matching that is not easily affected by noise can be achieved.

Sixth Embodiment

Alternate processing in the reference template updating sections 109 and 309 will be described in accordance with a sixth embodiment of the present invention. The alternate processing in the reference template updating sections 109 and 309 of this sixth embodiment can be used in the systems of the first, second, third and fourth embodiments. Thus, the alternate processing in the reference template creating updating sections 109 and 309 can be used in each of the previously discussed embodiments of the present invention. Since this sixth embodiment is merely modifying the processing of the reference template, the drawings and descriptions of the prior embodiments will be used to explain this embodiment. In other words, the descriptions of the processing of the reference template updating sections 109 and 309 and all other sections of the prior embodiments that are identical to the processing in this embodiment will be omitted for the sake of brevity.

The alternate processing of the reference template updating sections 109 and 309 differ from the prior embodiments in that, when the reference template updating sections 109 and 309 of this embodiment updates the reference template 30, pixels for which the dispersion value is small (below a prescribed value) for a prescribed period are not targeted for deletion during updating even if the dispersion became large. The alternate processing of the reference template updating sections 109 and 309 preferably include a counter that is configured to store the number of times the dispersion was small (below a prescribed value) for each pixel. The alternate processing of the reference template updating sections 109 and 309 are preferably configured and arranged to increment the counter and check the value of the counter each processing cycle.

If the dispersion of a pixel is small, i.e., the brightness value remains the same, for a prescribed period, it is highly likely that the pixel being evaluated is continuously photographing the same part of the same preceding vehicle 10. However, there are times when the brightness of the preceding vehicle 10 in an input image changes drastically for a moment due to the shadows of surrounding buildings, the direction of the sun, or light reflected from surrounding objects. Since this kind of brightness change does not indicate the true color or texture of the preceding vehicle 10, it is necessary to develop a configuration in which the reference template 30 is not greatly affected by temporary changes in the brightness value. With the alternate processing in the reference template updating sections 109 and 309, updating the reference template 30 is not affected by temporary changes in the surrounding environment. Thus, the reference template 30 that contain only a robust image of the preceding vehicle 10 can be created by preventing the creation of a reference template in which an image portion of the preceding vehicle 10 is missing because of temporary noise on the surface of the preceding vehicle 10 caused by such factors as severe backlighting or the shadows of surrounding buildings. Accordingly, the preceding vehicle 10 can be effectively tracked based only on the true color and distinguishing features of the preceding vehicle 10.

Seventh Embodiment

Another alternate processing in the reference template updating sections 109 and 309 will be described in accordance with a seventh embodiment of the present invention. The alternate processing of the reference template updating sections 109 and 309 of this seventh embodiment can be used in the systems of the first, second, third and fourth embodiments. Thus, the alternate processing in the reference template creating updating sections 109 and 309 can be used in each of the previously discussed embodiments of the present invention. Since this seventh embodiment is merely modifying the processing of the reference template, the drawings and descriptions of the prior embodiments will be used to explain this embodiment. In other words, the descriptions of the processing of the reference template updating sections 109 and 309 and all other sections of the prior embodiments that are identical to the processing in this embodiment will be omitted for the sake of brevity.

This alternate processing in the reference template updating sections 109 and 309 of this embodiment differ from the reference template updating sections 109 and 309 of the prior embodiments in that, when the reference template 30 is updated, the updating processing is ceased and the reference template 30 is defined when the number of tracking cycles exceeds a prescribed number of cycles and the dispersions of all pixels have been less than or equal to a prescribed value for a prescribed amount of time or longer. The alternate processing in the reference template updating sections 109 and 309 preferably includes a counter for each pixel (similarly to the sixth embodiment). The alternate processing in the reference template updating sections 109 and 309 are configured and arranged to count the number of cycles over which the dispersion is stabilized at a small value. Also, by constantly checking the number of cycles counted by the counter, the alternate processing in the reference template updating sections 109 and 309 can check that only pixels having a small dispersion have remained. Accordingly, the alternate processing in the reference template updating sections 109 and 309 make it possible to update the reference template 30 such that the reference template 30 includes only distinguishing features of the preceding vehicle 10. Moreover, the alternate processing in the reference template updating sections 109 and 309 contributes to reducing the calculation amount by omitting updating processing when the dispersion is small and the reference template 30 has become fixed. Particularly when traveling on highways, it is often the case that a vehicle will follow the same vehicle for several minutes. Consequently, more often than not, a reference template is updated only during a brief period immediately after the preceding vehicle is detected and, thereafter, the tracking processing is executed using fixed reference template. By stopping the updating processing using this alternate processing in the reference template updating sections 109 and 309, it is possible not only to execute vehicle tracking processing using the reference template 30 that excludes the background and only contains the vehicle, but also to execute that processing faster because the number of pixels in the reference template 30 have been reduced. Therefore, an amount of calculation required to track the preceding vehicle can be reduced.

Accordingly, the alternate processing in the reference template updating sections 109 and 309 of this embodiment can prevent the creation of reference templates in which a portion of the preceding vehicle 10 is missing due to the influence of noise or the like. Furthermore, since the reference template 30 is fixed, updating calculations can be eliminated, and thus, the amount of calculations can be reduced.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. Also, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-269638. The entire disclosure of Japanese Patent Application No. 2002-269638 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle tracking system for a vehicle, comprising:
   a first camera mounted on the vehicle;
   an image memory configured and arranged to store a first and second input images containing a remote vehicle received from the first camera;
   a vehicle detecting section configured and arranged to detect the remote vehicle based on the first input image stored in the image memory;

a reference template creating section configured and arranged to extract an image region including the remote vehicle from the first input image to be used as a reference template;

a reference template storing memory configured and arranged to store the reference template and a position in the first input image where the reference template was extracted;

a vehicle tracking processing section configured and arranged to determine a position and an enlargement/reduction ratio for at least a portion of the second input image that provide a maximum correlation value between the portion of the second input image and the reference template with respect to the remote vehicle, while enlarging or reducing the portion of the second input image in consideration of a change in size of the remote vehicle in the second input image;

a processing result outputting section configured and arranged to determine a position of the remote vehicle relative to the vehicle based on the position and the enlargement/reduction ratio of the portion of the second input image that provide the maximum correlation value;

a vehicle image storage memory configured and arranged to consecutively store a vehicle image extracted from the portion of the second input image at the position and the enlargement/reduction ratio that provide the maximum correlation value; and a reference template updating section configured and arranged to normalize the vehicle image and the reference template, calculate a dispersion of at least one pixel of the reference template with respect to a pixel at a corresponding position in the vehicle image, and update the reference template by deleting the at least one pixel when the dispersion of the at least one pixel is equal to or greater than a threshold value.

2. The vehicle tracking system as recited in claim 1, further comprising a tracking reliability determining section configured and arranged to compare the maximum correlation value obtained by the vehicle tracking processing section with a threshold value to determine a reliability of vehicle tracking.

3. The vehicle tracking system as recited in claim 2, wherein the image memory is further configured and arranged to obtain first and second differential images of the first and second input images, respectively;

the reference template creating section is further configured and arranged to create the reference template using the differential image of the first input image;

the vehicle tracking processing section is further configured and arranged to determine the enlargement/reduction ratio by using the first and second differential images to calculate the correlation value of the first and second input images.

4. The vehicle tracking system as recited in claim 2, wherein the reference template updating section is further configured and arranged to prohibit deleting the at least one pixel when the dispersion of the at least one pixel is relatively small for a prescribed period.

5. The vehicle tracking system as recited in claim 2, wherein the reference template updating section is further configured and arranged to cease updating the reference template when a number of tracking processing cycles exceeds a prescribed number of cycles and the dispersion of all pixels of the reference template have been less than or equal to a prescribed value for a prescribed amount of time or longer.

6. The vehicle tracking system as recited in claim 1, wherein the vehicle tracking processing section is further configured and arranged to detect edges of the remote vehicle in the first and second input images and determine the enlargement/reduction ratio to calculate the correlation based on change in distance between the edges in the first and second input images.

7. The vehicle tracking system as recited in claim 6, wherein the image memory is further configured and arranged to obtain first and second differential images of the first and second input images, respectively;

the reference template creating section is further configured and arranged to create the reference template using the differential image of the first input image;

the vehicle tracking processing section is further configured and arranged to determine the enlargement/reduction ratio by using the first and second differential images to calculate the correlation value of the first and second input images.

8. The vehicle tracking system as recited in claim 6, wherein the reference template updating section is further configured and arranged to prohibit deleting the at least one pixel when the dispersion of the at least one pixel is relatively small for a prescribed period.

9. The vehicle tracking system as recited in claim 6, wherein the reference template updating section is further configured and arranged to cease updating the reference template when a number of tracking processing cycles exceeds a prescribed number of cycles and the dispersion of all pixels of the reference template have been less than or equal to a prescribed value for a prescribed amount of time or longer.

10. The vehicle tracking system as recited in claim 1, further comprising a distance measurement section configured and arranged to obtain distance data indicative of a distance to the remote vehicle, the vehicle detecting section being further configured and arranged to detect the remote vehicle based on the distance data obtained by the distance measurement device, the reference template creating section being further configured and arranged to determine the image region including the remote vehicle based on detection of the remote vehicle by the vehicle detecting section, the reference template storage memory being further configured and arranged to store the distance data obtained when the first input image was captured, and the vehicle tracking processing section being further configured and arranged to determine the enlargement/reduction ratio based on a ratio of the distance data obtained when the second input image was captured to the distance data obtained when the first input image was captured.

11. The vehicle tracking system as recited in claim 10, wherein the image memory is further configured and arranged to obtain first and second differential images of the first and second input images, respectively;

the reference template creating section is further configured and arranged to create the reference template using the differential image of the first input image;

the vehicle tracking processing section is further configured and arranged to determine the enlargement/reduction ratio by using the first and second differential images to calculate the correlation value of the first and second input images.

12. The vehicle tracking system as recited in claim 10, wherein the reference template updating section is further configured and arranged to prohibit deleting the at least one pixel when the dispersion of the at least one pixel is relatively small for a prescribed period.

13. The vehicle tracking system as recited in claim 10, wherein the reference template updating section is further configured and arranged to cease updating the reference template when a number of tracking processing cycles exceeds a prescribed number of cycles and the dispersion of all pixels of the reference template have been less than or equal to a prescribed value for a prescribed amount of time or longer.

14. The vehicle tracking system as recited in claim 1, further comprising a second camera mounted on the vehicle; and a distance image creating section configured and arranged to determine a distance between the vehicle and the remote vehicle by creating a distance image including a distance value in each pixel obtained by calculating a parallax of the each pixel with respect to the remote vehicle between the first input image and a third input image simultaneously obtained with the first input image by the second camera, the image memory being further configured and arranged to store the third input image, the reference template creating section being further configured and arranged such that extraction of the reference template from the image region is based on the distance image, the vehicle tracking processing section being further configured and arranged to determine the enlargement/reduction ratio based on a ratio of the distance when the second input image was captured to the distance when the first input image was captured, and the reference template updating section being further configured and arranged to delete at least one pixel that includes the dispersion that is equal to or greater than a threshold value and a distance value that is different from a distance value indicative of the remote vehicle.

15. The vehicle tracking system as recited in claim 1, wherein the image memory is further configured and arranged to obtain first and second differential images of the first and second input images, respectively;

the reference template creating section is further configured and arranged to create the reference template using the differential image of the first input image;

the vehicle tracking processing section is further configured and arranged to determine the enlargement/reduction ratio by using the first and second differential images to calculate the correlation value of the first and second input images.

16. The vehicle tracking system as recited in claim 1, wherein the reference template updating section is further configured and arranged to prohibit deleting the at least one pixel when the dispersion of the at least one pixel is relatively small for a prescribed period.

17. The vehicle tracking system as recited in claim 1, wherein the reference template updating section is further configured and arranged to cease updating the reference template when a number of tracking processing cycles exceeds a prescribed number of cycles and the dispersion of all pixels of the reference template have been less than or equal to a prescribed value for a prescribed amount of time or longer.

18. A method of tracking a remote vehicle by using image processing of a plurality of images photographed by a camera mounted on a main vehicle, comprising detecting the remote vehicle in a first input image;

obtaining a reference template by extracting an image region containing the remote vehicle from the first input image when the remote vehicle is detected;

tracking the remote vehicle by determining a position of a portion of a second input image containing the remote vehicle and an enlargement/reduction ratio of the portion of the second input image that provide a maximum correlation value between the reference template and the portion of the second input image, while enlarging or reducing the portion of the second input image in consideration of a change in size of the remote vehicle in the second input image;

outputting a distance and a direction of the remote vehicle with respect to the vehicle as a remote vehicle detection result determined based on the position and the enlargement/reduction ratio of the second image at which the maximum correlation value was obtained;

storing at least one vehicle image extracted from the second image at the position and the enlargement/reduction ratio for which the maximum correlation value was obtained;

normalizing the reference template and the at least one vehicle image stored consecutively;

calculating a dispersion of at least one pixel in the reference template by comparing the reference template and the at least one vehicle image at a pixel that corresponds to the at least one pixel in the reference template;

updating the reference template by consecutively deleting the at least one pixel when the dispersion of the at least one pixel is equal to or greater than a threshold value to obtain an updated reference template; and using the updated reference template to execute the tracking of the remote vehicle.

19. A vehicle tracking system for a vehicle, comprising image inputting means for inputting a first and second input images;

image storing means for storing the first and second input images obtained in the image inputting means;

remote vehicle detecting means for detecting a remote vehicle in the first input image;

reference template creating means for creating a reference template including the remote vehicle extracted from the first input image based on a detection result in the remote vehicle detecting means;

vehicle tracking means for tracking the remote vehicle by calculating a position and an enlargement/reduction ratio of a portion of the second input image that provide a maximum correlation between the reference template and the second input image with respect to the remote vehicle;

tracking result outputting means for determining and outputting the position and the enlargement/reduction ratio of the portion of the second input image that provide the maximum correlation;

vehicle image storing means for storing a vehicle image extracted from the second input image at the position and the enlargement/reduction ratio that provide the maximum correlation; and reference template updating means for updating the reference template by normalizing the vehicle image and the reference template, calculating a dispersion of at least one pixel of the reference template with respect to a pixel at a corresponding position in the vehicle image, and deleting the at least one pixel of the reference template when the dispersion of the at least one pixel is equal to or greater than a threshold value.

* * * * *